(12) United States Patent
Jean et al.

(10) Patent No.: US 7,647,391 B1
(45) Date of Patent: Jan. 12, 2010

(54) PROCESSES AND SYSTEMS FOR CREATING AND FOR MANAGING TROUBLE TICKETS AND WORK ORDERS

(75) Inventors: David R. Jean, Palo Alto, CA (US); Judy M. Marcopulos, Duluth, GA (US); Rita H. Scherer, Birmingham, AL (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 1126 days.

(21) Appl. No.: 09/946,398

(22) Filed: Sep. 4, 2001
(Under 37 CFR 1.47)

(51) Int. Cl.
*G06F 15/173* (2006.01)
(52) U.S. Cl. .................. 709/223; 709/203; 709/217; 709/219; 709/246; 709/224; 705/29; 705/1; 705/9; 705/11; 705/22; 705/28; 707/1; 707/2; 707/3; 707/4; 707/200; 707/202
(58) Field of Classification Search ............. 709/203, 709/217, 219, 223, 224, 246; 705/26, 1, 705/9, 11, 22, 28, 29; 707/1, 2, 3, 4, 200, 707/202; 379/1.01, 9.03, 201.1, 201.2
See application file for complete search history.

(56) References Cited

U.S. PATENT DOCUMENTS

| 4,464,543 A | 8/1984 | Kline et al. | |
|---|---|---|---|
| 5,093,794 A * | 3/1992 | Howie et al. ............ | 700/100 |
| 5,155,761 A | 10/1992 | Hammond .............. | 379/67 |
| 5,285,494 A | 2/1994 | Sprecher et al. | |
| 5,406,616 A | 4/1995 | Bjorndahl .............. | 379/59 |
| 5,689,550 A | 11/1997 | Garson et al. | |
| 5,784,438 A | 7/1998 | Martinez ............... | 379/89 |
| 5,790,633 A | 8/1998 | Kinser et al. | |

(Continued)

FOREIGN PATENT DOCUMENTS

EP 0669586 A2 8/1995

(Continued)

OTHER PUBLICATIONS

E. Ghalichi et al., "The Dispatch Advisor-Merging Optimization and AI Technologies to Dispatch Service Technicians," in Proc. Workshop on AI for Customer Service & Support, 8th IEEE Conf. on AI Application, Monterey, CA, Mar. 3, 1992, pp. 60-68.

(Continued)

*Primary Examiner*—Ario Etienne
*Assistant Examiner*—Barbara N Burgess
(74) *Attorney, Agent, or Firm*—Cantor Colburn LLP

(57) ABSTRACT

Processes and systems are disclosed for creating and for managing trouble tickets and work orders. One embodiment includes communicating with a communications network and receiving a request to create a work order. The work order is initiated and identified with a work order number. The work order number includes a telephone number experiencing the problem. The work order is then distributed to clients, and the work order is identified and tracked using a customer's telephone number. A trouble ticket is similarly managed, with the trouble ticket describing a problem in a communications system. Here the trouble ticket is initiated and the work item number is assigned. The trouble ticket is then distributed to clients, and the trouble ticket is identified and tracked using a customer's telephone number.

47 Claims, 20 Drawing Sheets

U.S. PATENT DOCUMENTS

| | | | |
|---|---|---|---|
| 5,793,771 A | 8/1998 | Darland et al. ............... 370/467 |
| 5,893,906 A * | 4/1999 | Daffin et al. ................... 705/28 |
| 5,920,846 A | 7/1999 | Storch et al. |
| 5,937,048 A * | 8/1999 | Pelle ....................... 379/201.12 |
| 5,943,652 A | 8/1999 | Sisley et al. |
| 5,946,372 A | 8/1999 | Jones et al. |
| 5,946,373 A | 8/1999 | Harris |
| 5,953,389 A * | 9/1999 | Pruett et al. ..................... 379/9 |
| 5,956,024 A * | 9/1999 | Strickland et al. ........... 345/717 |
| 6,006,171 A | 12/1999 | Vines et al. |
| 6,018,567 A | 1/2000 | Dulman |
| 6,032,039 A | 2/2000 | Kaplan ....................... 455/413 |
| 6,173,047 B1 | 1/2001 | Malik ......................... 379/207 |
| 6,175,859 B1 | 1/2001 | Mohler ....................... 709/206 |
| 6,263,322 B1 * | 7/2001 | Kirkevold et al. ........... 705/400 |
| 6,289,382 B1 | 9/2001 | Bowman-Amuah |
| 6,295,540 B1 | 9/2001 | Sanschagrin et al. |
| 6,353,902 B1 | 3/2002 | Kulatunge et al. |
| 6,356,928 B1 | 3/2002 | Rochkind |
| 6,401,090 B1 | 6/2002 | Bailis et al. |
| 6,445,774 B1 | 9/2002 | Kidder et al. .............. 379/9.03 |
| 6,446,123 B1 | 9/2002 | Ballantine et al. |
| 6,493,694 B1 | 12/2002 | Xu et al. |
| 6,578,005 B1 | 6/2003 | Lesaint et al. |
| 6,614,882 B1 | 9/2003 | Beamon et al. |
| 6,633,782 B1 | 10/2003 | Schleiss et al. |
| 6,636,486 B1 * | 10/2003 | Magloughlin ................ 370/252 |
| 6,678,370 B1 * | 1/2004 | Freebersyser et al. .. 379/221.04 |
| 6,788,765 B1 * | 9/2004 | Beamon .................. 379/27.01 |
| 6,845,148 B1 | 1/2005 | Beamon |
| 6,870,900 B1 | 3/2005 | Beamon |
| 6,937,993 B1 | 8/2005 | Gabbita et al. |
| 6,961,415 B2 * | 11/2005 | Doherty et al. ........ 379/201.12 |
| 6,990,458 B2 | 1/2006 | Harrison et al. |
| 7,283,971 B1 | 10/2007 | Levine et al. |
| 2001/0029504 A1 * | 10/2001 | O'Kane et al. .............. 707/101 |
| 2002/0161731 A1 | 10/2002 | Tayebnejad et al. |
| 2002/0168054 A1 * | 11/2002 | Klos et al. ................. 379/1.04 |
| 2003/0069797 A1 * | 4/2003 | Harrison ...................... 705/26 |
| 2003/0187752 A1 * | 10/2003 | Kapiainen et al. ............. 705/26 |
| 2004/0022379 A1 * | 2/2004 | Klos et al. ............. 379/201.01 |
| 2004/0260668 A1 | 12/2004 | Bradford |
| 2005/0015504 A1 | 1/2005 | Dorne et al. |
| 2006/0050862 A1 | 3/2006 | Shen et al. |

FOREIGN PATENT DOCUMENTS

WO      WO 02/45393 A2      6/2002

OTHER PUBLICATIONS

J.E. Collins et al., "AI in filed Service; The Dispatch Advisor" in Workshop Note, AI In Service Support: Bridgine the Gap Between Research and Application, 11th National Conf. On AI Application, Wash. DC. ,Jul. 11-15, 1993 pp. 26-37.

J.E. Collins et al., "Automated Assignment and Scheduling of Service Personnel" IEEE Expert, vol. 9, No. 2, Apr. 1994, pp. 33-39.

Lesaint, D., C. Voudouris, and N. Azarmi. (2000). Dynamic Workforce Scheduling for British Telecommunications plc. Interfaces 30 (1), 45-52.

Lesaint, D., C. Voudouris, N. Azarmi, and B. Laithwaite. (1997). Dynamic Workforce Management. In Proceedings of the 1997 IEE Colloquium on AI for Network Management Systems, IEE Stevenage, UK, England, pp. 1/1-1/5.

Lesaint, D., N. Azarmi, R. Laithwaite, and P. Walker. (1998). Engineering Dynamic Scheduler for Work Manager. BT Technology Journal 16(3), 16-29.

Lesaint, D.,Voudouris, C., Azarmi, N., Alletson, I. and Laithwaite, B. (2003). Field workforce scheduling. In BT Technology Journal, 21, Kluwer Academic Publishers, pp. 23-26.

Software Systems for Telecommunications, Science and Technology Series, Bell Communications Research, Oct. 1992, (retrieved from application file U.S. Appl. No. 08/608,838), pp. 34-35, 52-55, 58, 59.

Rey, R.F., Engineering and Operations in the Bell System, AT&T Bell Laboratories, Murray Hill, NJ, 1984, pp. 605-621.

Garwood G J: 'Work Manager', BT Technol J, 15, pp. 58-68 (1997).

Collins, J.E.; Sisley, E.M., "Automated assignment and scheduling of service personnel," IEEE Expert, vol. 9, No. 2, pp. 33-39, Apr. 1994.

Guido, B.; Roberto, G. Di Tria, P. Bisio, R., "Workforce management (WFM) issues," Network Operations and Management Symposium, 1998. NOMS 98., IEEE, vol. 2, no., pp. 473-482 vol. 2, 15-20.

An Extensible Message Format for Message Disposition Notifications, R. Fajman, National Institutes of Health, Mar. 1998.

Impact Voice Mail Server Deluxe, Black Ice Software Inc., CTI Expo, Spring 1999.

BellSouth Memory Call VoiceMail Services, 1999.

Voice Profile for Internet Mail—Version 2, G. Vaudreuil—Lucent Technologies and G. Parsons—Northern Telecom, Sep. 1998.

IP Infrastructure: The Fastest Track for Tomorrow's Unified Communications, Arthur Rosenberg and David Zimmer, The Unified View, Oct. 2000.

TDB: Computerized Call-Return Feature, IBM Technical Disclosure Bulletin, Apr. 1986.

US 6,826,262, 11/2004, Jean et al. (withdrawn)

* cited by examiner

PROCESSES AND SYSTEMS FOR CREATING AND FOR MANAGING TROUBLE TICKETS AND WORK ORDERS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to work order management systems and, more particularly, to processes and systems that manage and that broker work orders and trouble tickets from initial creation to final closure.

2. Description of the Related Art

Most residential and business telephone customers are connected to telephone/communication systems by copper cables and wires. These copper cables are the familiar one or more telephone lines running throughout nearly every home in the United States. Because copper cable and wire connects each home, and many businesses, to the communication system, the Public Switched Telephone Network is composed of billions of copper cables and wires. Each of these copper cables must be maintained to provide superior service to the customer.

Yet maintaining these copper cables and wires is an extraordinary task. The Public Switched Telephone Network, with its millions of copper cables and wires, may receive hundreds of maintenance calls per day. These maintenance calls, in turn, may result in hundreds of maintenance work orders or trouble tickets. These hundreds of daily maintenance calls, and the resultant work orders/trouble tickets, must be efficiently managed to prevent maintenance costs from eroding profits. These resultant work orders/trouble tickets must also be efficiently managed to ensure customers receive a quick response and a quick resolution to their communication problems.

While efficiency and service are the goals, communication service providers struggle with trouble management systems that are decades-old. Most service providers are continually resuscitating legacy computer equipment and computer code. The computer equipment is often so old that spare parts are no longer available. The computer code of these early systems is also outdated, requiring specialized knowledge of older code to keep the system maintained. These legacy management systems are, thus, challenging and expensive to maintain and to preserve.

The legacy management systems are also inefficient, slow, and inaccurate. The legacy Loop Maintenance Operating System, for example, maintains an extremely large database of over twenty four million (+24,000,000) line records. As more and more customers request additional telephone lines, digital subscriber lines, and other plain, old telephone system enhancements, this extremely large database of line records must accordingly grow. Such an extremely large database system inefficiently retrieves line records and is slow to provide such data. Such a large legacy database also means the data is often corrupt. Service providers are simply unable to dynamically update the database as the line records change. Moreover, efficient management techniques, such as correlation and screening of trouble tickets, is hampered by the corrupt data. These old, legacy management systems, therefore, reduce the ability of service providers to meet the growing demands in today's competitive environment There is, accordingly, a need in the art for management systems that are less expensive to use and to maintain, that reduce the need for large database infrastructures, that meet or exceed current performance levels, that are more reliable configurations, that improve the use of correlation, screening, and other efficient management techniques, and that reduce the costs of maintaining operations.

BRIEF SUMMARY OF THE INVENTION

The aforementioned problems are reduced by a Trouble Ticket Manager. The Trouble Ticket Manager comprises processes and systems that create and that manage work orders and trouble tickets. The Trouble Ticket Manager facilitates the management, the resolution, and the recording of work orders and trouble tickets. The Trouble Ticket Manager maintains all the functionality of the legacy managements systems, yet, eliminates the need for an extremely large database of line records. The Trouble Ticket Manager also performs as well, or even better, than the legacy systems, however, the Trouble Ticket Manager utilizes a new, modular design that permits easier future expansion. The processes and systems of the Trouble Ticket Manager also utilize a highly reliant, modern operating system and program code that is easily maintained. Embodiments of the Trouble Ticket Manager also provide new capabilities, such as permitting special handling instruction, permitting user comments and annotations, and configuring work orders/trouble tickets by geographic segments.

The Trouble Ticket Manager provides a more efficient management system. The Trouble Ticket Manager correlates trouble tickets/work orders into groups that share similar characteristics. The Trouble Ticket Manager also screens trouble tickets for any characteristic desired. Correlation, for example, would permit a single technician to receive and to close several related work orders. If several telephone customers report faulty phone service, the Trouble Ticket Manager correlates the complaints and dispatches a single truck to repair a faulty cable. No longer will multiple repair trucks respond to each customer call, only to converge upon the single, faulty telephone cable. Screening, as another example, permits a manager to filter trouble tickets for any characteristic desired. The manager may even specify what action should be taken if the characteristic is found. If, for example, the work order includes a trouble code indicating a problem with complex equipment, the manager could specify that only a certain knowledgeable, properly-trained technician receive the work order. The Trouble Ticket Manager thus quickly and automatically diagnoses and resolves customer problems. The Trouble Ticket Manager, therefore, quickly identifies the root cause of problems and efficiently resolves customer complaints.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
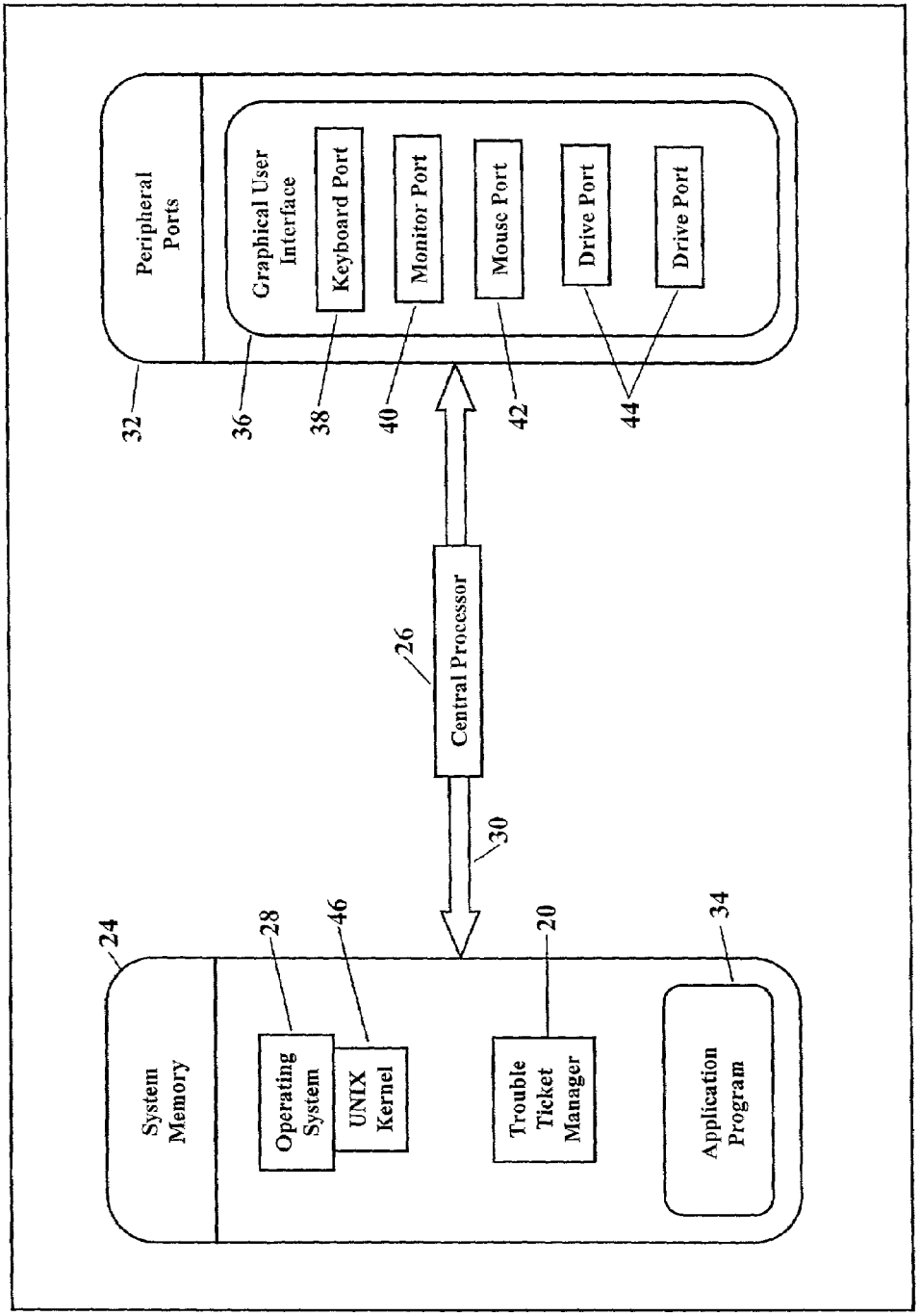
FIG. 1 is a block diagram showing the Trouble Ticket Manager residing in a computer system.

The present invention particularly relates to processes and to systems for creating and for managing trouble tickets and work orders. One embodiment includes communicating with a communications network and receiving a request to create a work order. The work order is initiated and identified with a work order number. The work order number comprises a telephone number experiencing the problem. The work order is then distributed to clients, and the work order is identified and tracked using a customer's telephone number.

Another embodiment comprises a computer program for creating a work order for repair of a problem. The computer program communicates with a communications network and receives a request to create the work order. An appointment is also received, with the appointment reserving a date and time for a field visit to repair the problem. The request and the appointment are each identified with a work order number. The work order number comprises a telephone number experiencing the problem. The work order number is returned to the requestor via the communications network. The work order is initiated, and the work order is also identified using the work order number. The work order is then distributed along the communications network. The computer program associates the work order with the telephone number for tracking the work order after creation.

A further embodiment provides a process for creating and for managing a trouble ticket. The trouble ticket describes a problem in a communications system. A request to create the trouble ticket is received from the communications network. The trouble ticket is initiated and is assigned a work item number. The work item number comprises a telephone number experiencing the problem with the communications system. The trouble ticket is then distributed via the communications network to clients. The process thus identifies and tracks the trouble ticket using a customer's telephone number.

Another embodiment includes a computer program for creating and managing a trouble ticket. The trouble ticket describes a problem in a communications system. The computer program communicates with the communications network and receives a request to create the trouble ticket. The trouble ticket is initiated and assigned the work item number. The work item number comprises a telephone number experiencing the problem with the communications system. The trouble ticket is correlated with an existing trouble ticket having a similar characteristic. The trouble ticket is also screened for known indications of trouble in the communications system. Results of a test of the communication system are received, with the test helping identify the problem with the telephone number. The results of the test are analyzed to help identify the problem with the telephone number. The trouble ticket is then closed when the problem with the telephone number is cleared. The computer program, therefore, tracks and manages the trouble ticket using a customer's telephone number.

Another process for creating and for managing a trouble ticket is also provided. The trouble ticket, as before, describes a problem in a communications system. The process communicates with the communications network and receives a request to create the trouble ticket. A request is communicated along the communications network to initiate the trouble ticket and to assign the work item number to the trouble ticket. The work item number comprises a telephone number experiencing the problem with the communications system. A request to distribute the trouble ticket to clients is then communicated. The process thus identifies and tracks the trouble ticket using a customer's telephone number.

A further embodiment of a computer program is additionally provided. This computer program creates and manages the trouble ticket. The computer program communicates with the communications network and receives a request to create the trouble ticket. The computer program requests that the trouble ticket be initiated and that a work item number be assigned to the trouble ticket. The work item number comprises a telephone number experiencing the problem with the communications system. A request is communicated to correlate the trouble ticket with an existing trouble ticket having a similar characteristic. A request is also communicated to screen the trouble ticket for known indications of trouble in the communications system. The computer program requests results of a test of the communication system, with the test helping identify the problem with the telephone number. A request is communicated to analyze the results of the test to help identify the problem with the telephone number. The computer program also requests that the trouble ticket be closed when the problem with the telephone number is cleared. The computer program, therefore, tracks and manages the trouble ticket using a customer's telephone number.

A system for creating and for managing a trouble ticket is also included. The trouble ticket describes a problem in a communications system. The system has a Trouble Ticket Manager and a processor. The Trouble Ticket Manager communicates with a communications network and receives a request to create the trouble ticket. The Trouble Ticket Manager initiates the trouble ticket and assigns a work item number to the trouble ticket. The work item number comprises a telephone number experiencing the problem with the communications system. The Trouble Ticket Manager distributes the trouble ticket along the communications network to clients. The processor is capable of processing the request, is capable of initiating the trouble ticket, and is capable of assigning the work item number. The system identifies and tracks the trouble ticket using a customer's telephone number.

A computer program product is also disclosed. The computer program product creates and manages a trouble ticket describing a problem in a communications system. The computer program product includes a computer-readable medium and a Trouble Ticket Manager stored on the medium. The Trouble Ticket Manager communicates with the communications network, receives a request to create the trouble ticket, initiates the trouble ticket, and assigns a work item number to the trouble ticket. The work item number comprises a telephone number experiencing the problem. The Trouble Ticket Manager distributes the trouble ticket along the communications network to clients, wherein the computer program product identifies and tracks the trouble ticket using a customer's telephone number.

Figure 2:
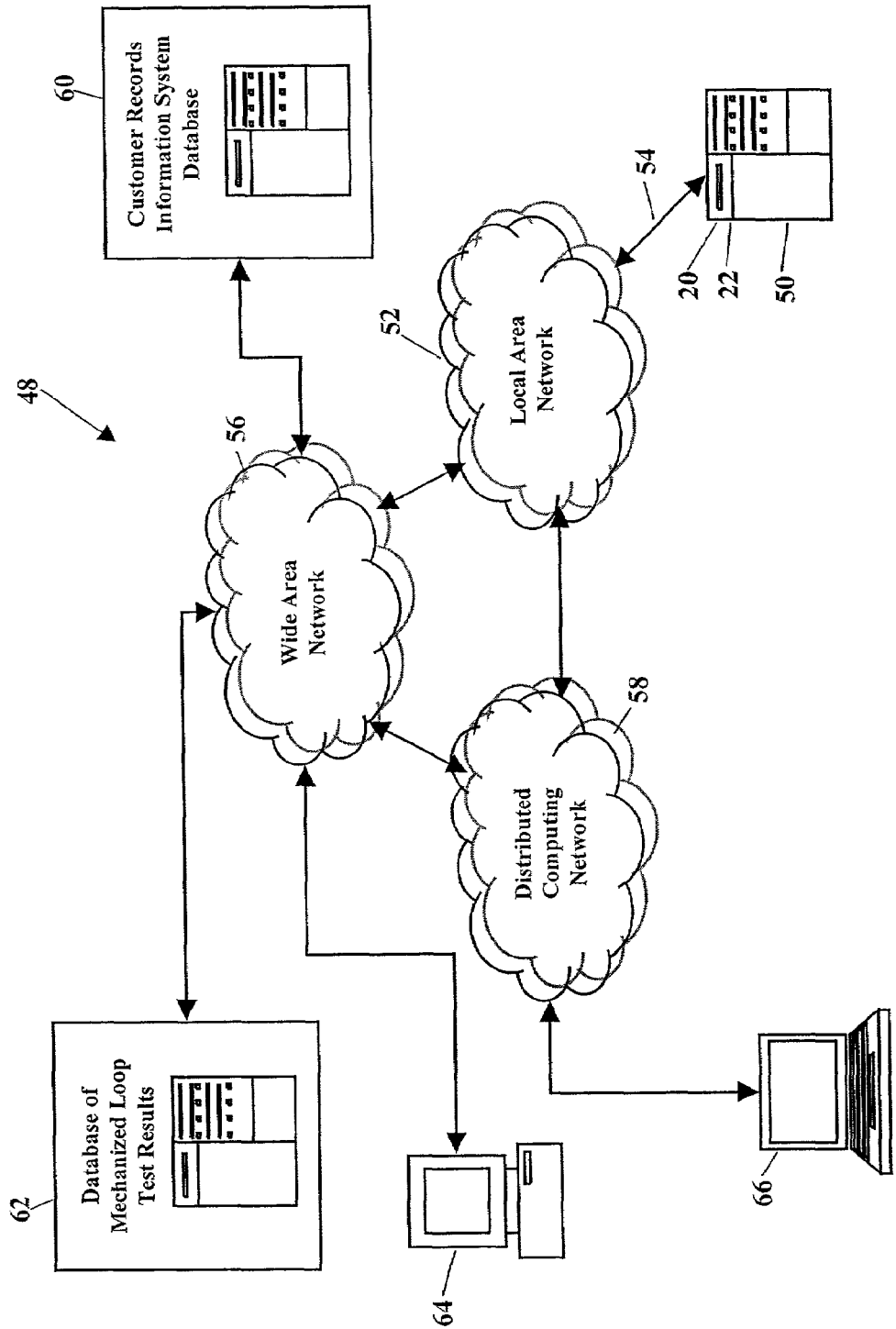
FIG. 2 is a schematic diagram of a communications network representing an alternative operating environment.

FIGS. 1 and 2 depict a possible operating environment for an embodiment of the present invention. This embodiment of a Trouble Ticket Manager 20 comprises a computer program that creates and manages work orders and trouble tickets. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those of ordinary skill in the art of computer programming, to convey the discoveries in the art.

FIG. 1 is a block diagram showing the Trouble Ticket Manager 20 residing in a computer system 22. The Trouble Ticket Manager 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in the art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). While only one microprocessor is shown, those of ordinary skill in the art also recognize multiple processors may be utilized. Those of ordinary skill in the art further understand that the program, processes, methods, and systems described in this patent are not limited to any particular manufacturer's central processor.

The preferred operating system 28 is the UNIX® operating system (UNIX® is a registered trademark of the Open Source Group, www.opensource.org). Those of ordinary skill in the art also recognize many other operating systems are suitable. Other suitable operating systems include UNIX-based Linux, WINDOWS NT® (WINDOWS NT® is a registered trademark of Microsoft Corporation, One Microsoft Way, Redmond Wash. 98052-6399, 425.882.8080, www.Microsoft.com), and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a schematic diagram of a communications network 48. This communications network 48 further represents an operating environment for the Trouble Ticket Manager 20. The Trouble Ticket Manager 20 resides within the memory storage device (shown as reference numeral 24 in FIG. 1) in the computer system 22. The computer system 22 is conveniently shown as a computer server 50, however, the Trouble Ticket Manager 20 may reside in any computer system. The computer server 50 communicates with a Local Area Network (LAN) 52 along one or more data communication lines 54. As those of ordinary skill in the art understand, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56 and with a globally-distributed computing network 58 (e.g. the "Internet"). The communications network 48 allows the Trouble Ticket Manager 20 to request and acquire information from many computers connected to the Local Area Network 52, the Wide Area Network 56, and the globally-distributed computing network 58.

As FIG. 2 shows, the Trouble Ticket Manager module 20 sends and receives information to/from many other computers connected to the communications network 48. The Trouble Ticket Manager 20, for example, may acquire customer information from a server maintaining a Customer Records Information System (CRIS) 60. The Trouble Ticket Manager 20 may also acquire test results from a server maintaining a database 62 of mechanized loop test results. The Trouble Ticket Manager 20 may also communicate information over the communications network 48 to a user at a user computer 64. FIG. 2 even shows that remote users, such as programmers and engineers, may use a portable computer 66 to access the communications network 48 and remotely access the Trouble Ticket Manager 20. Because many computers may be connected to the communications network 48, computers and computer users may share and communicate a vast amount of information.

Figure 3:
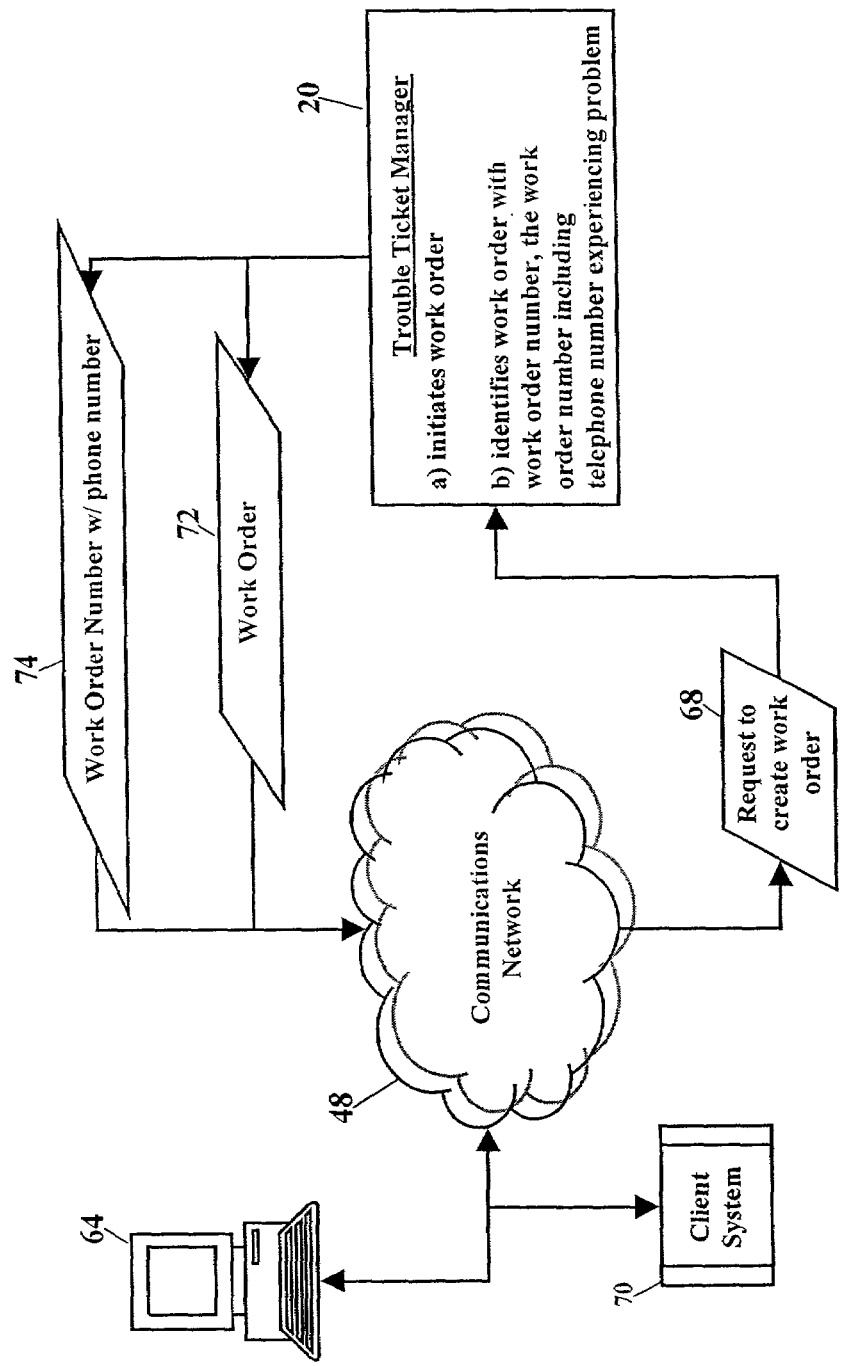
FIG. 3 is a schematic drawing of one embodiment of the Trouble Ticket Manager.

FIG. 3 is a schematic drawing of one embodiment of the Trouble Ticket Manager 20. The Trouble Ticket Manager 20 creates a work order for repair of a problem and then manages the work order from creation to closure. The Trouble Ticket Manager 20 communicates with the communications network 48 and receives a request 68 to create the work order. The request 68 to create the work order is communicated from the user at the user computer 64 or from a client system 70. The Trouble Ticket Manager 20 initiates the work order and identifies the work order with a work order number. The work order number includes a telephone number experiencing the problem. The Trouble Ticket Manager 20 then communicates a work order 72, identified by the work order number 74, to the communications network 48 for distribution.

The work order number 74 includes the telephone number experiencing the problem. The work order number 74 could be any unique number that identifies the work order 72. The work order number 74 in this embodiment, however, includes a customer's telephone number. Because a telephone number is already a unique identifier in many instances, the Trouble Ticket Manager 20 identifies and tracks the work order using the telephone number. Whether the work order 72 describes a residential plumbing repair, an electrical repair at a business, or a tool and die model shop service request, each work order 72 may be uniquely identified using a telephone number. The telephone number could be a residential telephone number of a residence requiring the plumbing repair. The telephone number could be a business telephone number of a business requiring the electrical repair. The telephone number could also be the telephone extension of an engineer, a supervisor, or other person/department requesting the model shop's services. Even if extra characters must be annotated, such as for multiple repairs involving the same telephone number, the telephone number still represents a unique identifier of work orders. Because the telephone number is unique, the work order 72 may be initiated, tracked, and closed using the telephone number.

Figure 4:
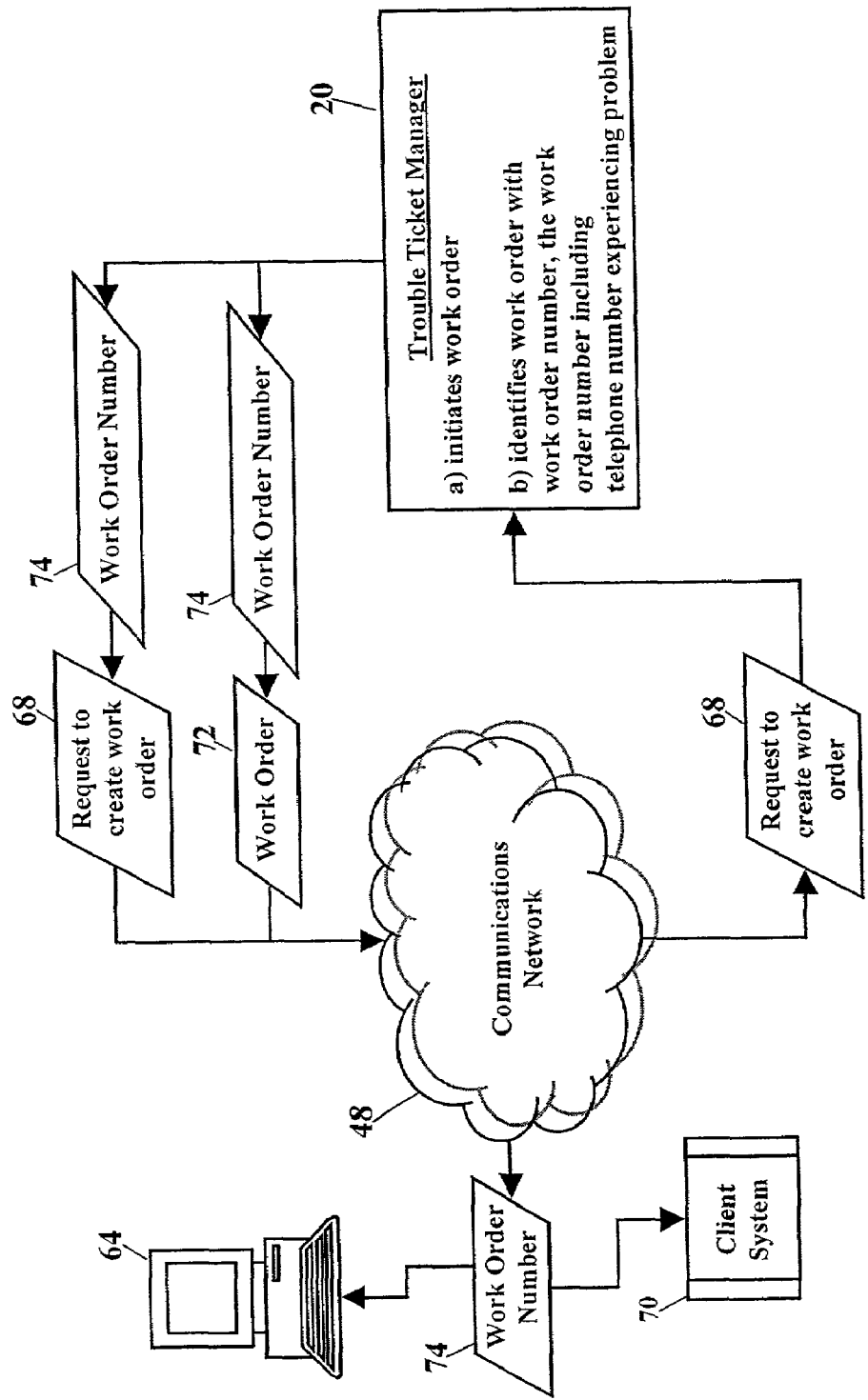
FIG. 4 is a schematic drawing of another embodiment of the Trouble Ticket Manager.

FIG. 4 is a schematic drawing of another embodiment of the Trouble Ticket Manager 20. The Trouble Ticket Manager 20 receives the request 68 to create the work order and then communicates the work order 72, identified by the work order number 74, to the communications network 48. FIG. 4 shows the request 68 to create the work order could also be identified with the work order number 74 and distributed along the communications network 48. The work order number 74 could be returned, if desired, to the user at the user computer 64 or to the client system 70.

Figure 5:
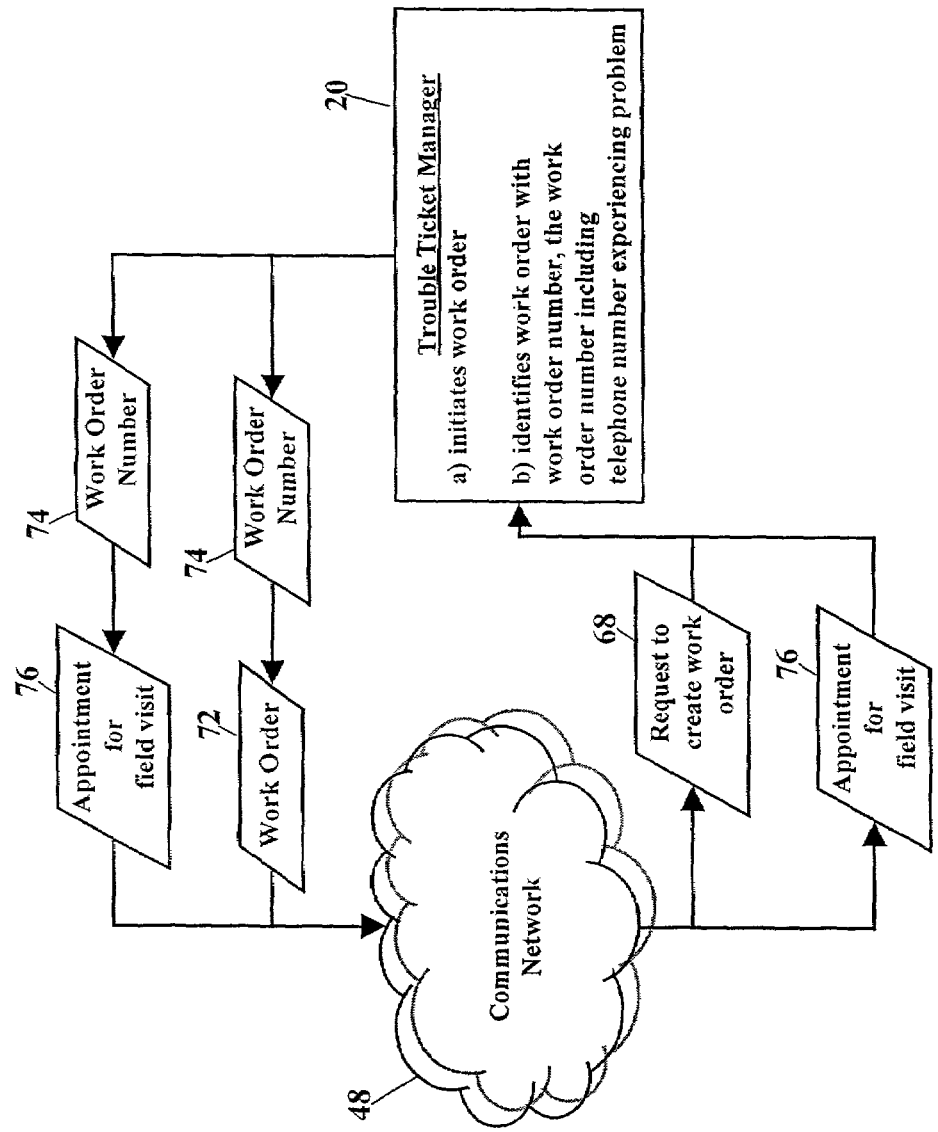
FIG. 5 is a schematic drawing of still another embodiment of the Trouble Ticket Manager.

FIG. 5 is a schematic drawing of still another embodiment of the Trouble Ticket Manager 20. Here the Trouble Ticket Manager 20 receives the request 68 to create the work order and also receives an appointment 76 for a field visit. The Trouble Ticket Manager 20, as before, initiates the work order 72. The work order 72 may include the appointment 76 for the field visit. The Trouble Ticket Manager 20 could also identify the appointment 76 with the work order number 74. The work order number 74, as before, includes a telephone number experiencing the problem. The Trouble Ticket Manager 20 then communicates the work order 72 and the appointment 76, both identified by the work order number 74, to the communications network 48 for distribution. The Trouble Ticket Manager 20, therefore, tracks the appointment 76 using the work order number 74.

Figure 6:
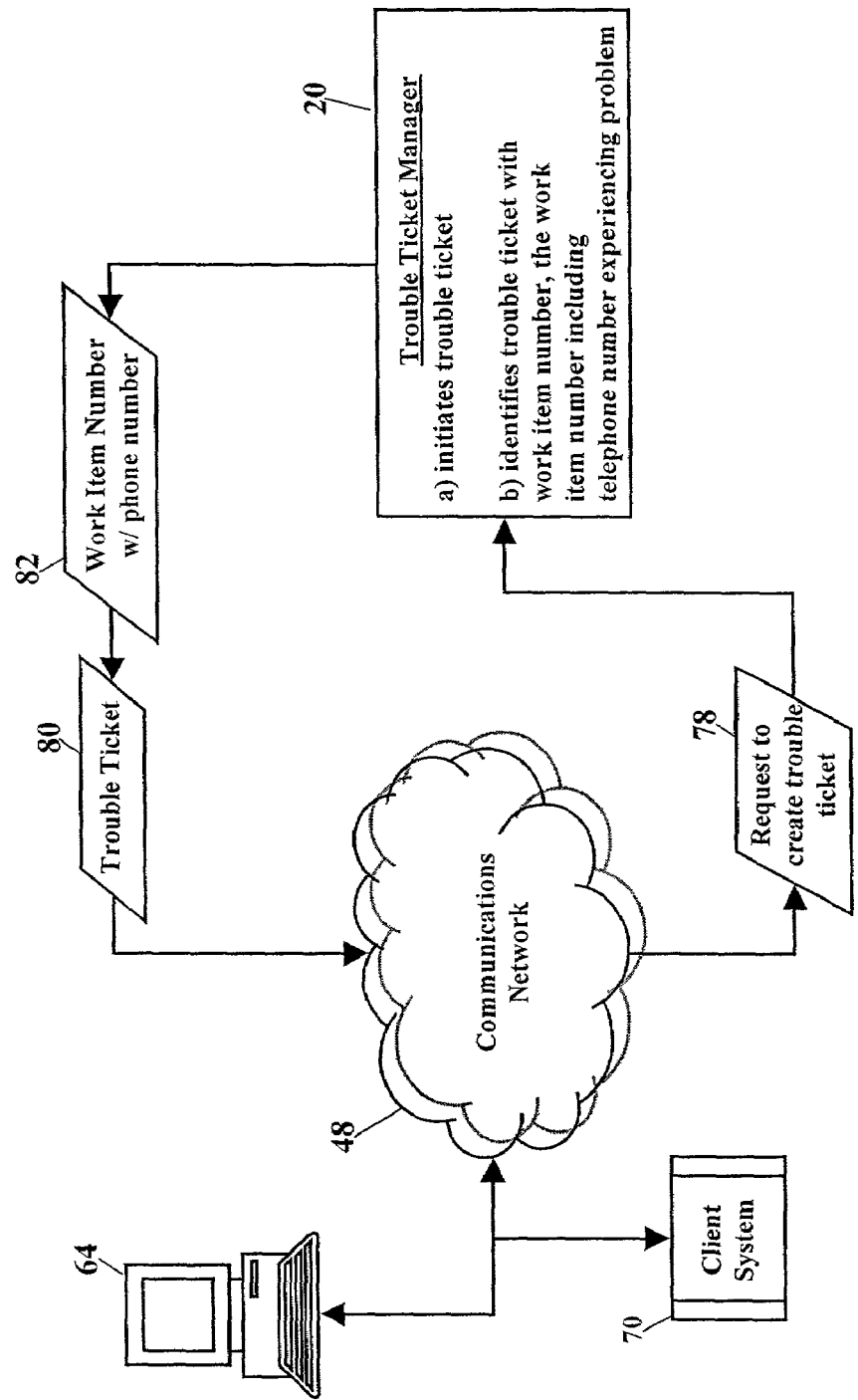
FIG. 6 shows the Trouble Ticket Manager receiving a request to create a trouble ticket.

FIG. 6 is a schematic drawing of a further embodiment of the Trouble Ticket Manager 20. The Trouble Ticket Manager 20, in this embodiment, is a process for creating and for managing a trouble ticket. A trouble ticket, as those of ordinary skill in the art of telecommunications recognize, describes a problem in a communications system. While some industries use the term "work order" for maintenance operations, the communications industry uses "trouble ticket" to denote maintenance of a local loop, digital subscriber lines, fiber optic cables and lines, and other inside and outside physical loop maintenance. Although the following discussion describes creating and managing trouble tickets, the same discussion is equally applicable to work orders.

FIG. 6 shows the Trouble Ticket Manager 20 receiving a request 78 to create the trouble ticket. The request 78 to create the trouble ticket, as before, is communicated from the user at the user computer 64 or from the client system 70. The Trouble Ticket Manager 20 initiates the trouble ticket 80 and assigns a work item number 82 to the trouble ticket. The work item number 82 comprises a telephone number experiencing the problem. The Trouble Ticket Manager 20 communicates the trouble ticket 80, with the work item number 82, to the communications network 48 for distribution to clients. The Trouble Ticket Manager 20 thus identifies and tracks the trouble ticket 80 using a customer's telephone number.

The work item number 82 includes the telephone number experiencing the problem. A telephone number, as explained for the work order number (shown as reference numeral 74 in FIGS. 3-5), is already a unique identifier. The Trouble Ticket Manager 20, therefore, identifies and tracks the trouble ticket 80 using the telephone number. While extra characters might be annotated to distinguish multiple repairs for or at the same telephone number, the telephone number represents a unique identifier of trouble tickets. Because the telephone number is unique, the trouble ticket 80 may be initiated, tracked, and closed using the telephone number.

Figure 7:
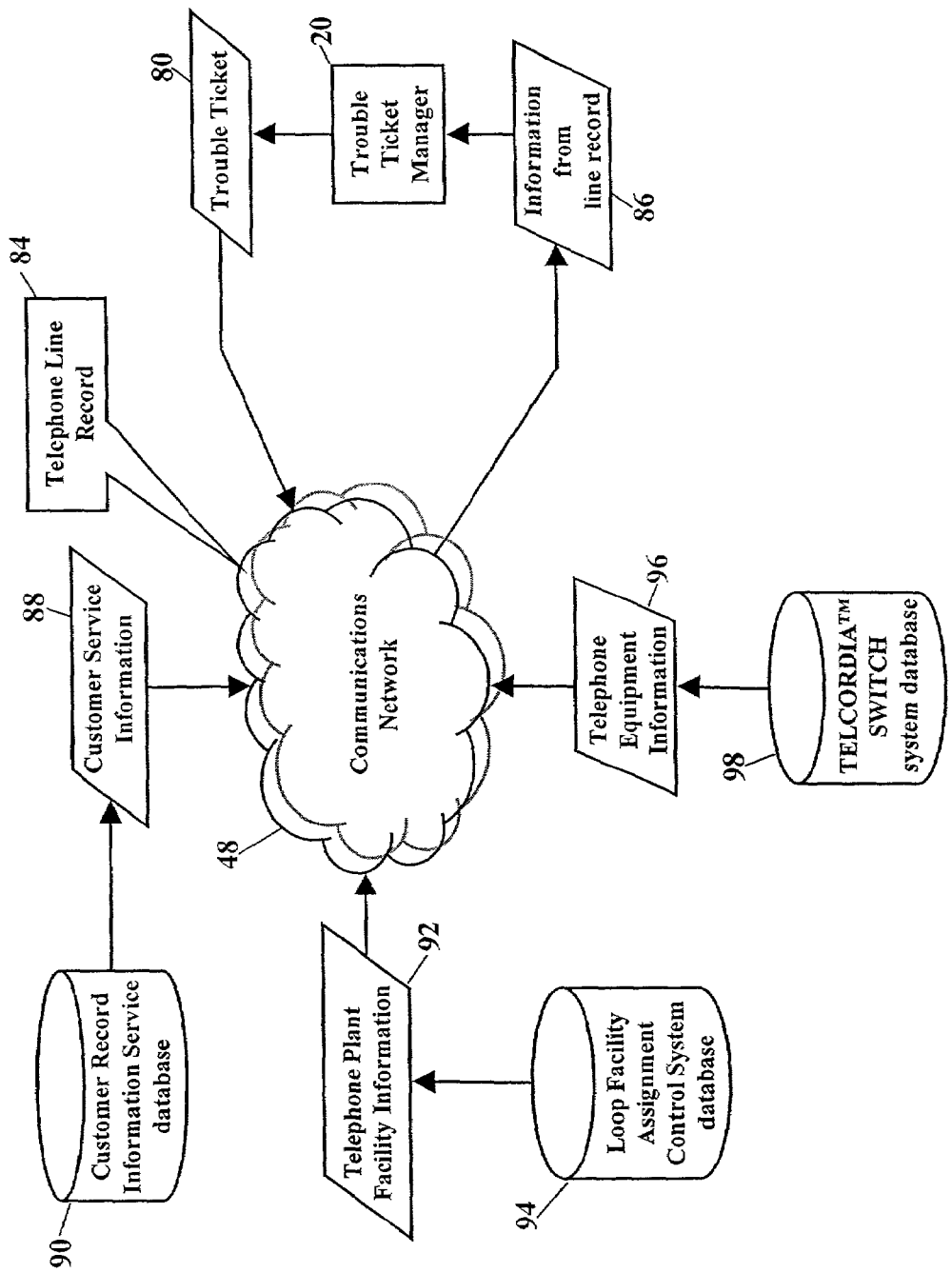
FIG. 7 is a schematic drawing of still another embodiment of the Trouble Ticket Manager.

FIG. 7 is a schematic drawing of still another embodiment of the Trouble Ticket Manager 20. Here the Trouble Ticket Manager 20 creates the trouble ticket 80 using a telephone line record 84. As those of ordinary skill recognize, the telephone line record 84 describes, in real-time, a customer's telephone service, the condition of the communication system physical facility serving the customer, and the telephone/communication equipment installed at the customer's residence or business. FIG. 7 shows the Trouble Ticket Manager 20 may annotate the trouble ticket 80 with information 86 from the telephone line record. The information 86 from the telephone line record could include at least one of i) customer information 88 from a Customer Record Information System 90, ii) facility information 92 from a Loop Facility Assignment Control System 94, and iii) equipment information 96 from a switch system 98. The trouble ticket 80, with the annotated information 86 from the telephone line record, would then be communicated along the communications network 48 for distribution. The assembly of the telephone line record 84, and the information 86 from the telephone line record, is more fully shown and described in U.S. application Ser. No. 09/946,405, filed concurrently herewith, entitled METHODS AND SYSTEMS FOR ASSEMBLING TELEPHONE LINE RECORDS, and incorporated herein by reference in its entirety.

Figure 8:
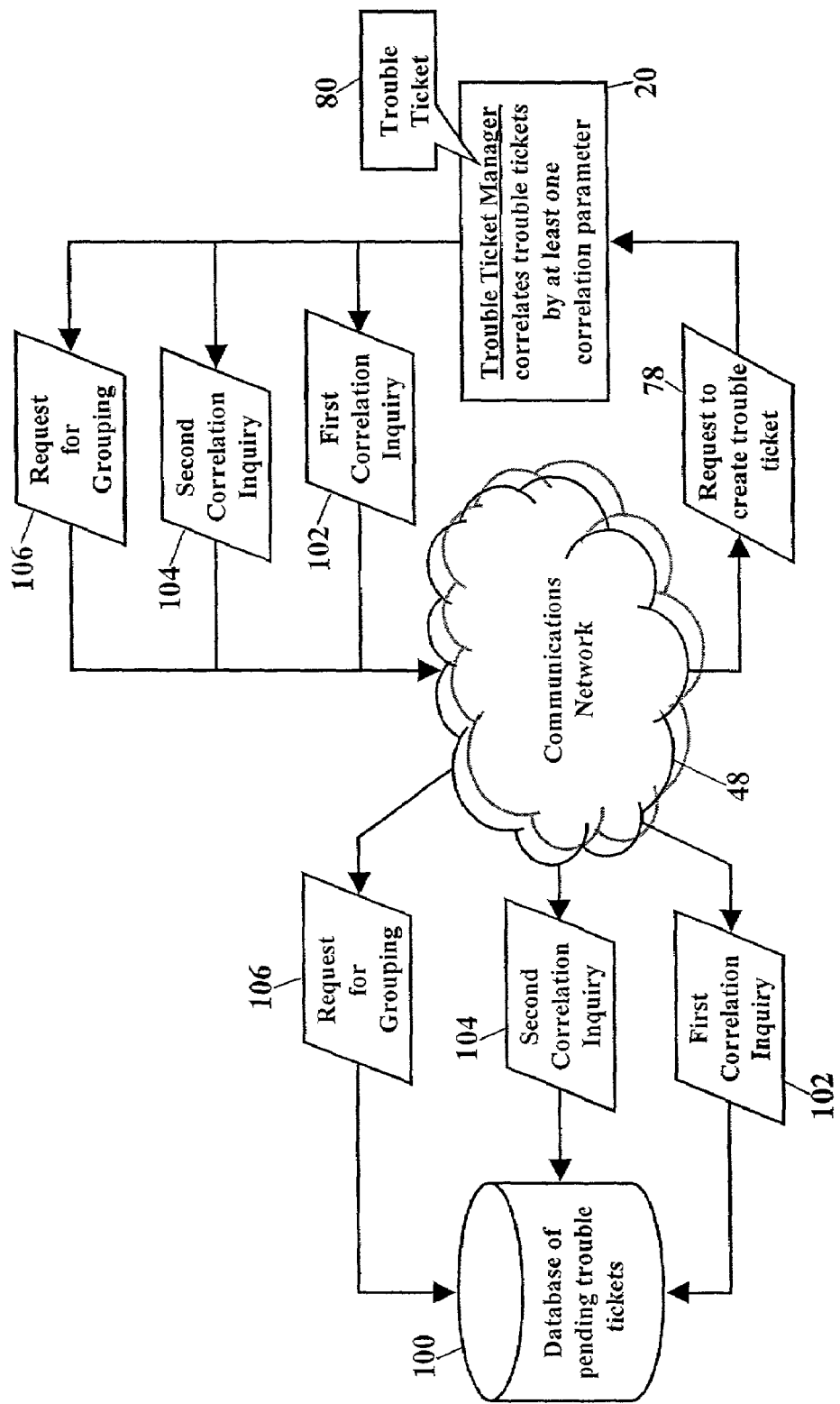
FIG. 8 is a schematic dr awing of a further embodiment of the Trouble Ticket Manager.

FIG. 8 is a schematic drawing of a further embodiment of the Trouble Ticket Manager 20. Once the trouble ticket 80 is created, the trouble ticket 80 may be correlated with other pending trouble tickets. "Correlation" describes grouping the trouble ticket 80 with one or more existing trouble tickets having similar characteristics. The Trouble Ticket Manager 20 correlates the trouble ticket 80 with existing trouble tickets according to at least one correlation parameter. The Trouble Ticket Manager 20, for example, searches the trouble ticket 80 for a first predetermined correlation parameter and/or a second predetermined correlation parameter. If the trouble ticket 80 contains the at least one correlation parameter, then the Trouble Ticket Manager 20 requests that a database 100 of pending trouble tickets be searched for the same at least one correlation parameter. A first correlation inquiry 102, and a second correlation inquiry 104, inquires whether any existing, pending trouble tickets also contain the first and second correlation parameters. If an existing work order contains both the first and second correlation parameters, the Trouble Ticket Manager 20 then communicates a request for grouping 106. The Trouble Ticket Manager 20 requests that the trouble ticket 80 be grouped with any existing work orders that share the first and second correlation parameters. Correlation of trouble tickets, and thus work orders, is more fully shown and described in U.S. application Ser. No. 09/946,272, filed concurrently herewith, entitled PROCESSES AND SYSTEMS FOR CORRELATING WORK ORDERS, and incorporated herein by reference in its entirety.

Figure 9:
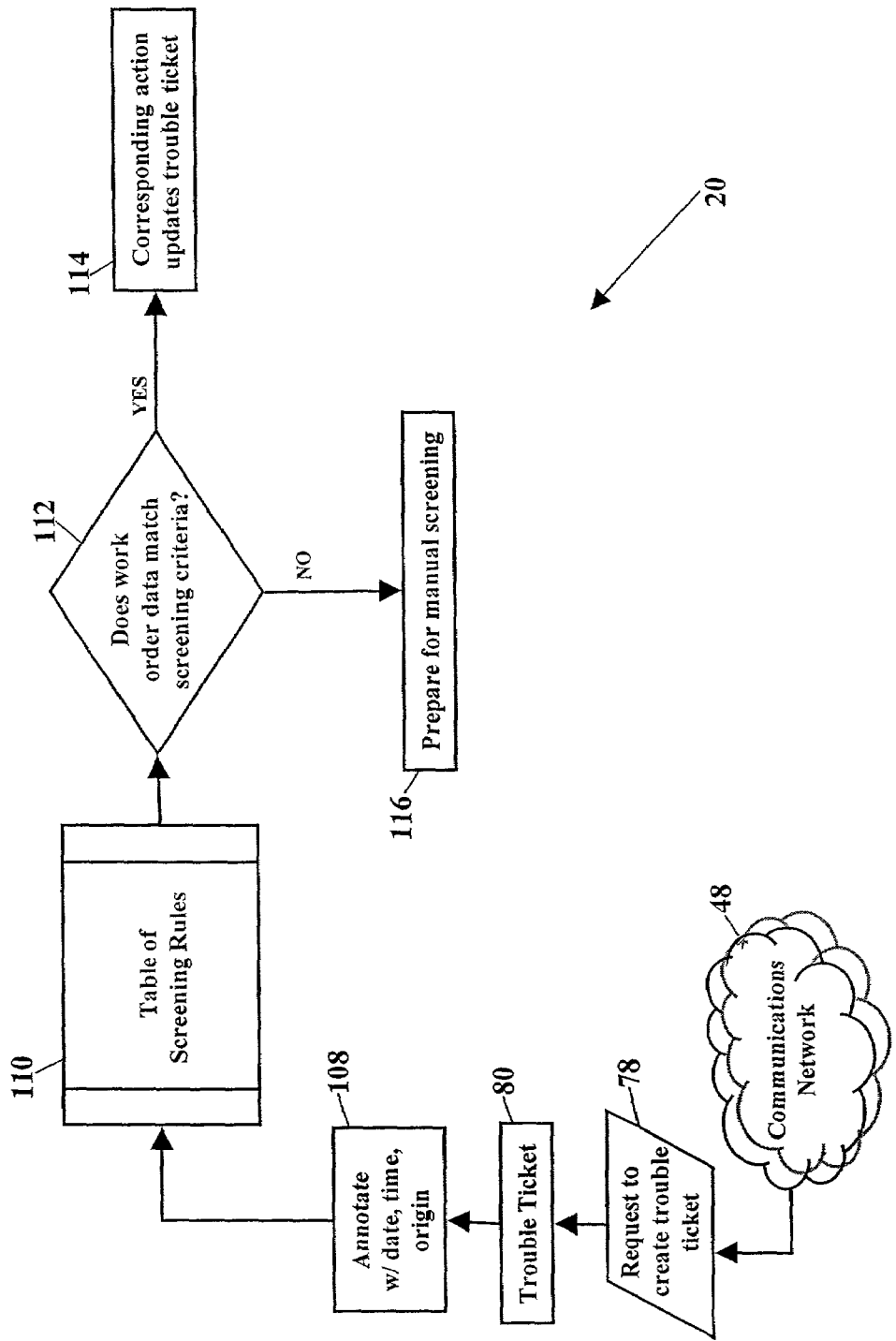
FIG. 9 is a schematic drawing of an alternative embodiment of the Trouble Ticket Manager.

FIG. 9 is a schematic drawing of an alternative embodiment of the Trouble Ticket Manager 20. The Trouble Ticket Manager 20 receives the request 78 to create the trouble ticket and, as before, initiates the creation of the trouble ticket 80. Here, however, the Trouble Ticket Manager 20 also screens the trouble ticket 80 for known indications of trouble in the communications system. As FIG. 9 illustrates, the trouble ticket 80 is annotated with at least one of a date, a time, and an origin of the trouble ticket (Block 108). The origin of the trouble ticket 80 indicates what user, or what client system, has sent the request 78 to create the trouble ticket. The annotated trouble ticket 80 is then filtered using a table 110 of screening rules. The table 110 of screening rules contains at least one user-defined screening criteria and a corresponding action. If the trouble ticket 80 contains data that matches the screening criteria (Block 112), then the trouble ticket 80 is updated according to the corresponding action (Block 114). If the trouble ticket 80 does not contain data that matches the screening criteria (Block 112), then the Trouble Ticket Manager 20 prepares the trouble ticket 80 for manual screening (Block 116). The screening of trouble tickets, and thus work orders, is more fully shown and described in U.S. application Ser. No. 09/946,269, filed concurrently herewith, entitled PROCESSES AND SYSTEMS FOR SCREENING WORK ORDERS, and incorporated herein by reference in its entirety. The table 110 of screening rules may thus be used to filter the trouble ticket 80 for known trouble codes or for other definable criteria.

The Trouble Ticket Manager 20 may also prioritize trouble tickets. Because the Trouble Ticket Manager may annotate the trouble ticket 80 with at least one of a date, a time, and an origin of the trouble ticket (Block 108), the Trouble Ticket Manager 20 may then use that same annotation to prioritize. The Trouble Ticket Manager 20 could prioritize the trouble ticket 80 according to an origin of the request 78 to create the trouble ticket. Thus some client systems or some users could have priority access to the Trouble Ticket Manager 20. The Trouble Ticket Manager 20 could alternatively prioritize the trouble ticket 80 according to the annotated date and time, such as for First In, First Out (FIFO) or Last In, First Out (LIFO) scenarios.

Figure 10:
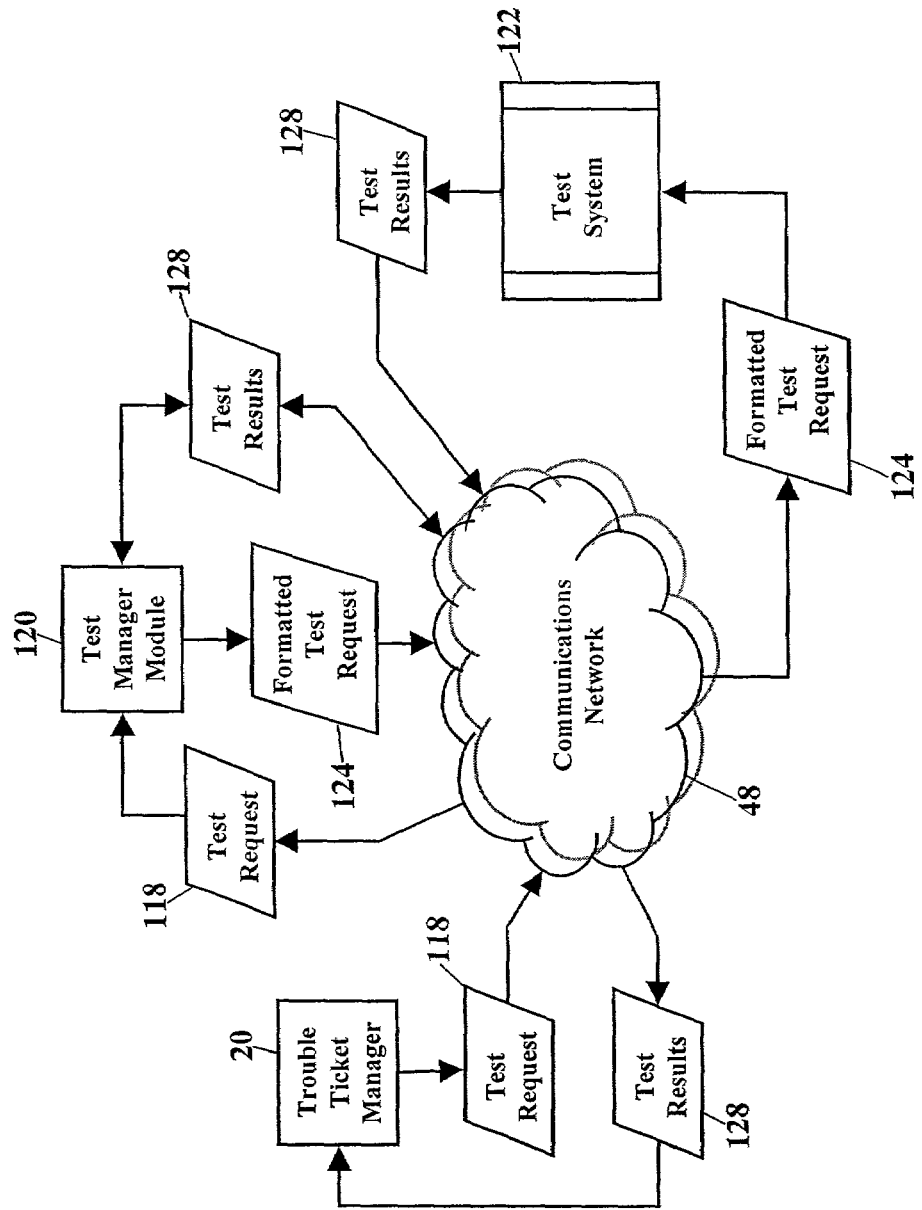
FIGS. 10, 11, and 12 are schematic drawings of a further alternative embodiment of the Trouble Ticket Manager.
Figure 11:
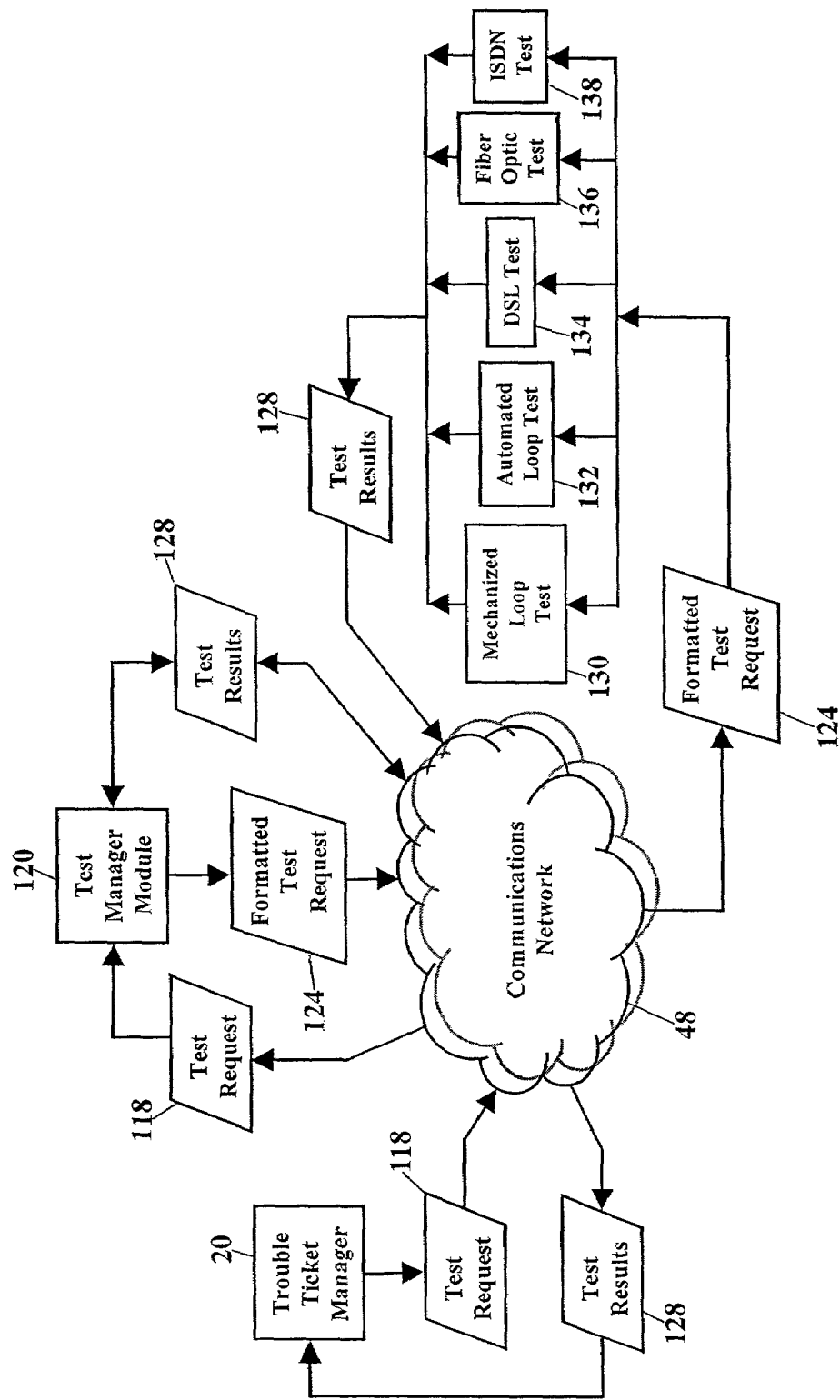
Figure 12:
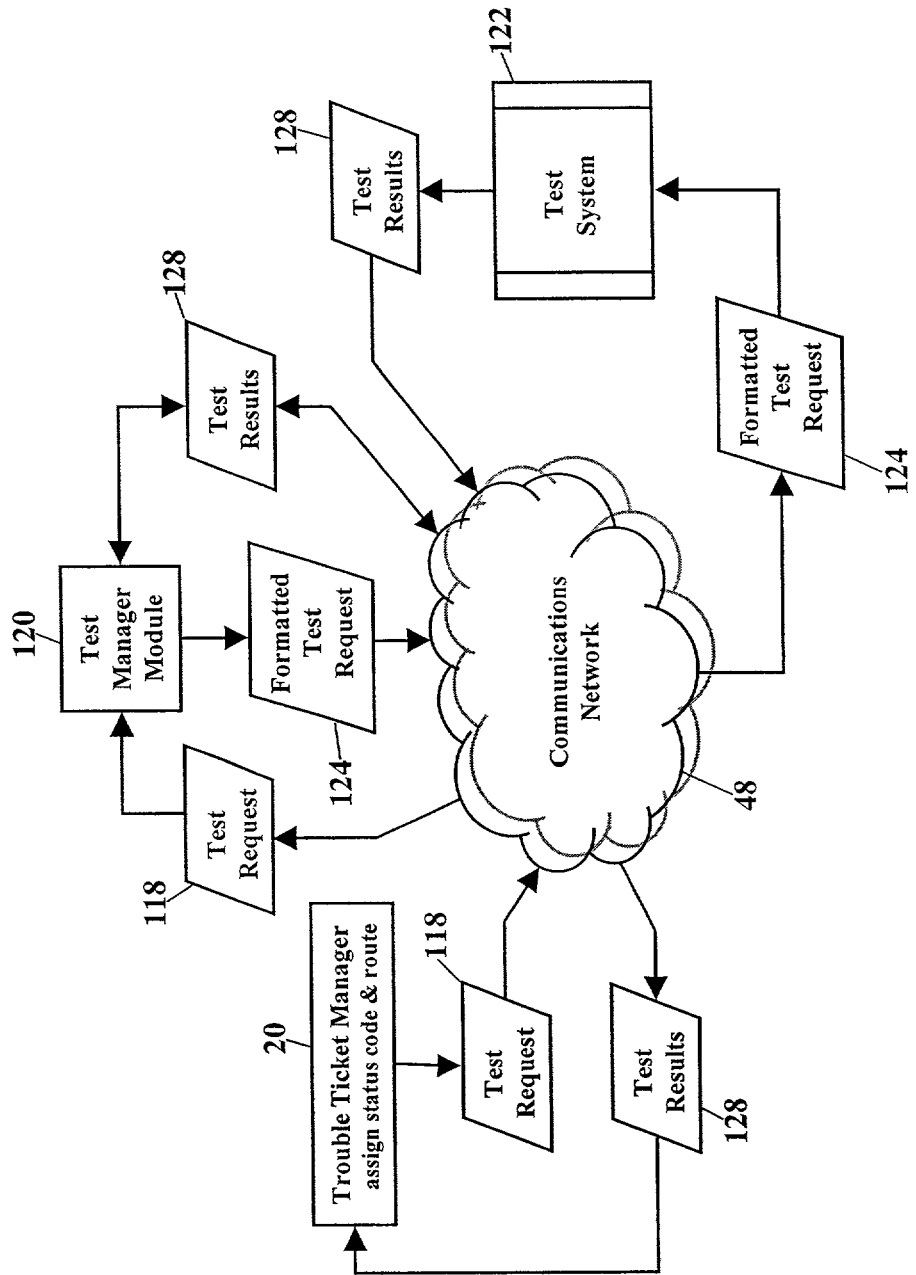

FIGS. 10, 11, and 12 are schematic drawings of a further alternative embodiment of the Trouble Ticket Manager 20. Here the Trouble Ticket Manager 20 initiates a test of the communications system, receives the results of the test, and then analyzes the results to help identify the problem with the telephone number. As FIG. 10 illustrates, the Trouble Ticket Manager 20 communicates with the communications network 48 and sends a test request 118. The test request 118 is received by a Test Manager module 120. The Test Manager module 120 analyzes the test request 118, determines which test system 122 is requested, and brokers all communication with the requested test system 122. The Test Manager module 120 formats the test request 118 and sends a formatted test request 124 to the test system 122. The test system 122 performs the requested test and returns test results 128. The Test Manager module 120 then distributes the test results 128 along the communications network 48 to the Trouble Ticket Manager 20.

FIG. 11 shows the Test Manager module 120 interfacing with various test systems used within the communications system. The Test Manager module 120, as mentioned, receives the test request 118 and analyzes which test system is requested. The Test Manager module 120 then brokers all communication with the requested test system. FIG. 11 shows that the test request 118 may require a mechanized loop test 130, some other automated local loop test system 132, a Digital Subscriber Line (DSL) test system 134, a fiber optic test system 136, or an Integrated Services Digital Network (ISDN) test system 138. Whatever test system is requested, the requested test system performs the requested test and returns the test results 128. The Test Manager module 120 then distributes the test results 128 along the communications network 48 to the Trouble Ticket Manager 20.

FIG. 12 shows the Trouble Ticket Manager 20 routing trouble tickets. The Trouble Ticket Manager 20, for example, could assign a status code to the trouble ticket. The status code could be assigned according to the test results 128 or according to the problem with the telephone number. Once the status code is assigned, the trouble ticket 80 could be routed according to the status code, according to the test results, or according to the problem with the telephone number. The testing of trouble tickets and work orders is more fully shown and described in U.S. application Ser. No. 09/946,266, filed concurrently herewith, entitled PROCESSES AND SYSTEMS FOR MANAGING TESTING OF COMMUNICATIONS SYSTEMS, and incorporated herein by reference in its entirety.

Figure 13:
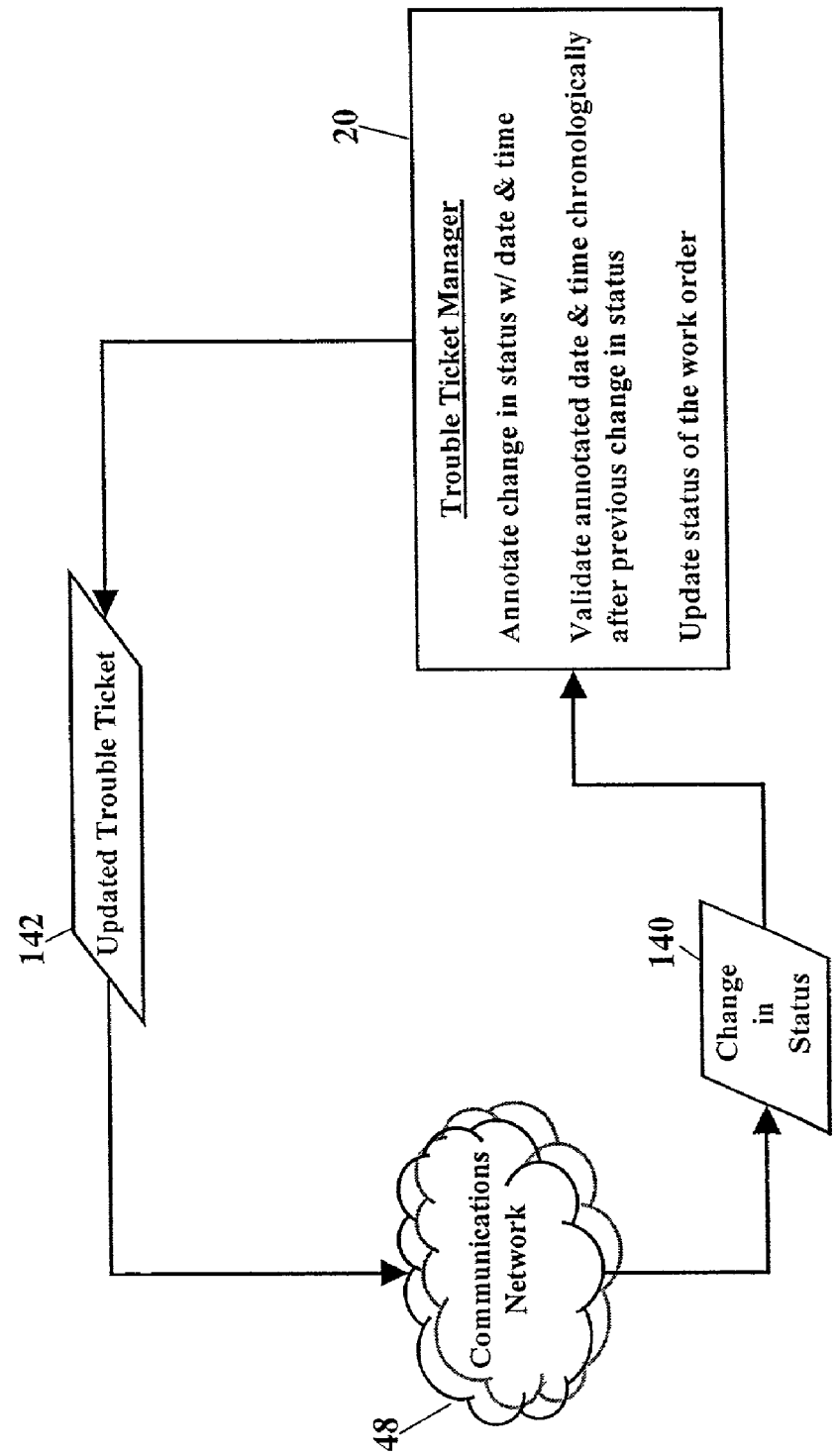
FIG. 13 is another alternative embodiment of the Trouble Ticket Manager.

FIG. 13 is another alternative embodiment of the Trouble Ticket Manager 20. FIG. 13 shows the Trouble Ticket Manager 20 communicating with the communications network 48 and receiving a change in status 140 to the trouble ticket (shown as reference numeral 80 in FIGS. 6-9). The Trouble Ticket Manager 20 may annotate the change in status 140 with a date and a time. The Trouble Ticket Manager 20 could also validate that the annotated date and the time are chronologically after a previous change in status. The status of the trouble ticket is then updated. The Trouble Ticket Manager 20 could then communicate an updated trouble ticket 142 to the communications network 48. The updated trouble ticket 142 could reflect the validated change in status 140. The Trouble Ticket Manager 20 thus updates the trouble ticket with each change in status 140 as the trouble ticket progresses from creation to final closure. Statusing of trouble tickets and work orders is more fully shown and described in U.S. application Ser. No. 09/946,270, filed concurrently herewith, entitled PROCESSES AND SYSTEMS FOR MANAGING STATUS CHANGES TO WORK ORDERS, and incorporated herein by reference in its entirety.

Figure 14:
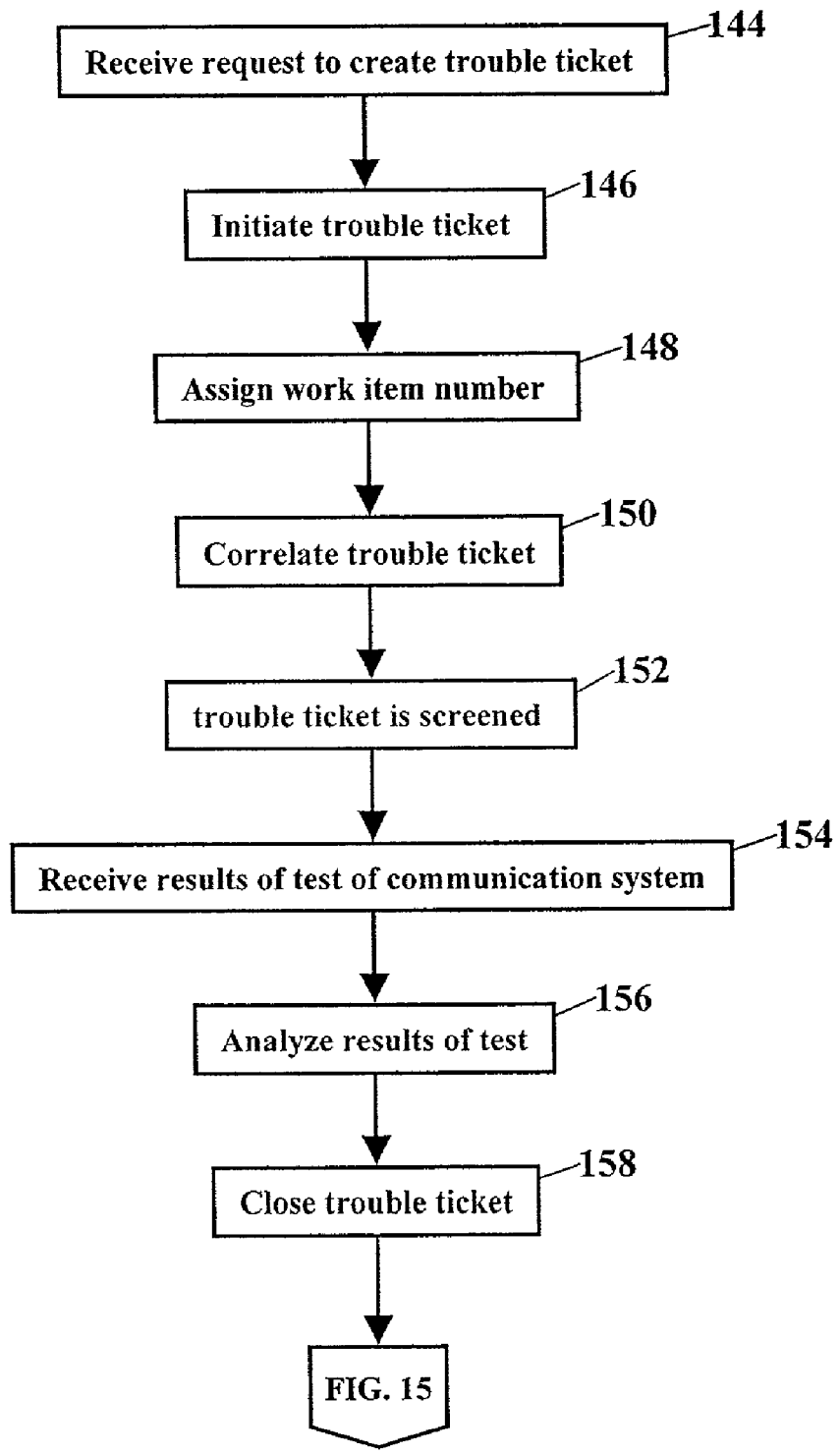
FIGS. 14 and 15 are flowcharts further describing the creation and management of trouble tickets.
Figure 15:
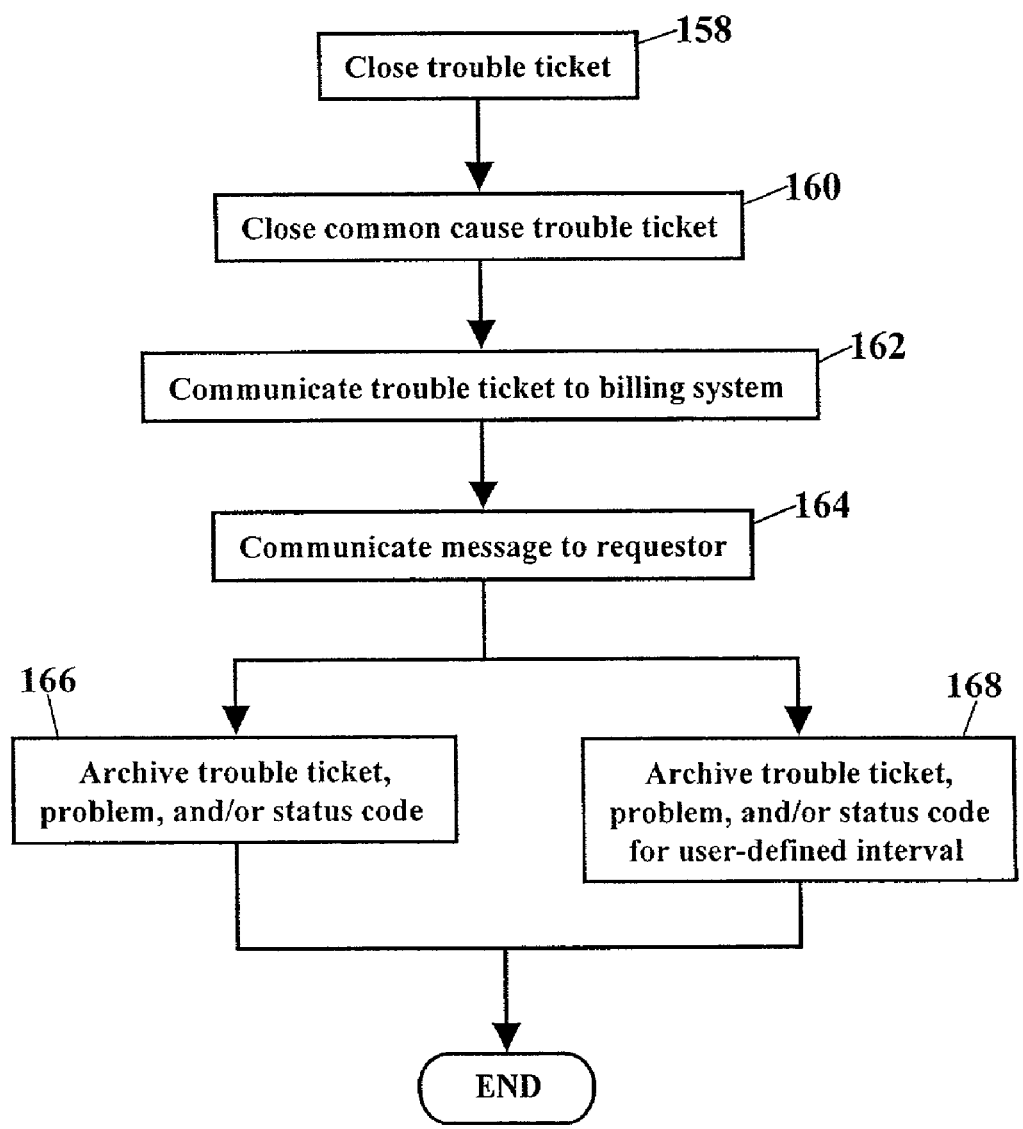

FIGS. 14 and 15 are flowcharts further describing the creation and management of trouble tickets. A trouble ticket, as before, describes a problem in a communications system. A request to create the trouble ticket is received from the communications network (Block 144). The trouble ticket is initiated (Block 146) and a work item number is assigned to the trouble ticket (Block 148). The work item number, as earlier described, comprises a telephone number experiencing the problem with the communications system. The trouble ticket is correlated (Block 150) with an existing trouble ticket having a similar characteristic, and the trouble ticket is screened (Block 152) for known indications of trouble in the communications system. The results of a test of the communication system are received (Block 154). The test helps identify the problem experienced by the telephone number. The results of the test are analyzed (Block 156) to help identify the problem with the telephone number. The trouble ticket is closed (Block 158) when the problem experienced by the telephone number is cleared.

FIG. 15 continues describing the creation and management of trouble tickets. The trouble ticket, as before, is closed (Block 158) when the problem experienced by the telephone number is cleared. Any related trouble ticket, having a common cause, is also closed (Block 160). The trouble ticket may be communicated to a billing system to update billing records (Block 162). A message to the requester may also be communicated when the trouble ticket is closed (Block 164). The trouble ticket, the problem, and/or a status code indicating the problem may be archived for subsequent retrieval (Block 166). Each may alternatively be archived for a user-defined interval of time (Block 168), thus permitting further analysis and use, yet, without requiring an a large expansion of storage capability.

Figure 16:
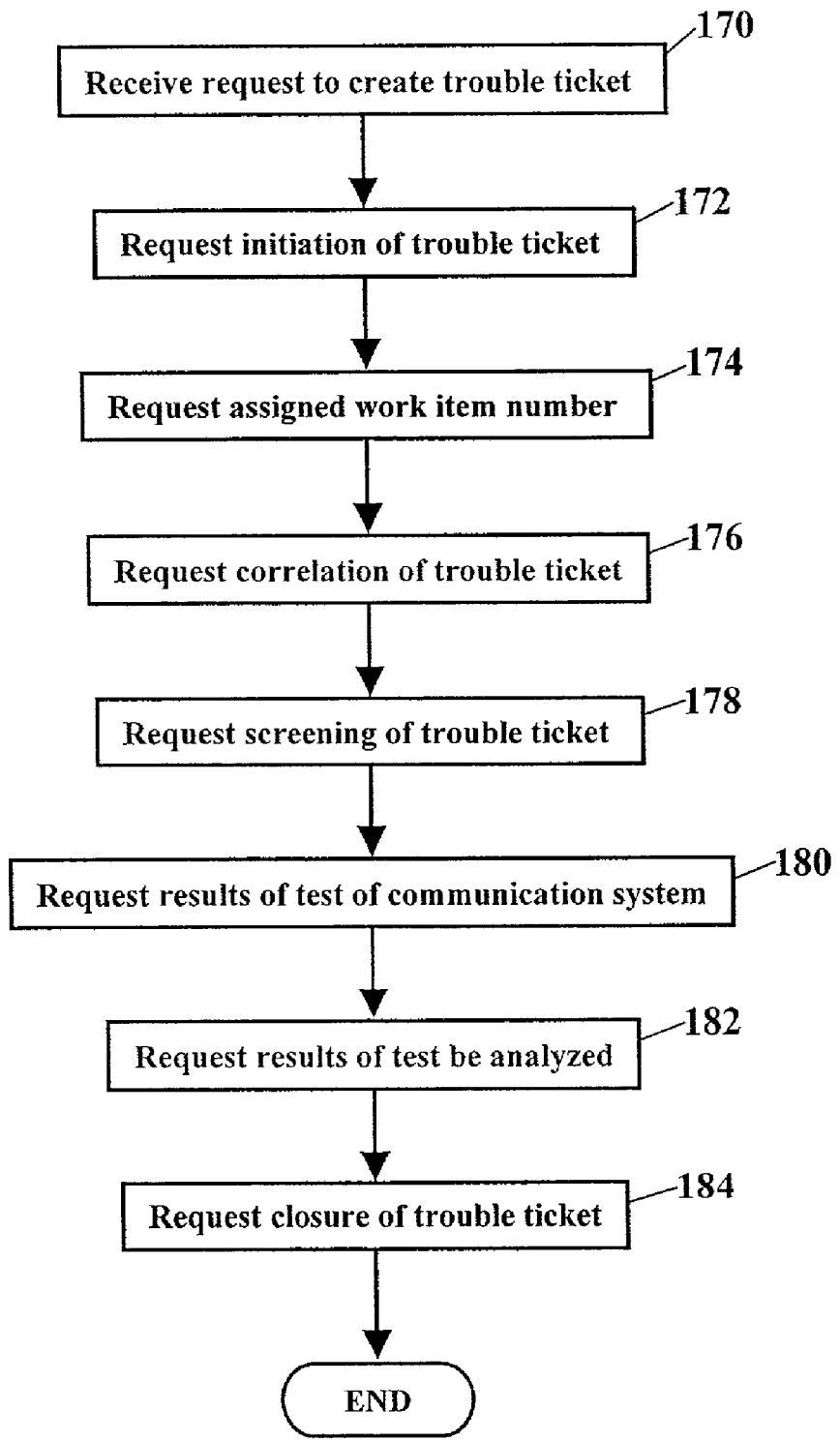
FIG. 16 is a flowchart describing a computer program for creating and for managing a trouble ticket.

FIG. 16 is a flowchart describing a computer program for creating and for managing a trouble ticket. A request to create the trouble ticket is received (Block 170). A request, in response, is communicated to initiate the trouble ticket (Block 172). An assigned work item number is also requested (Block 174) to track the trouble ticket. The work item number comprises a telephone number experiencing the problem with the communications system. The computer program may request that the trouble ticket be correlated (Block 176) with an existing trouble ticket having a similar characteristic. The computer program could request that the trouble ticket be screened (Block 178) for known indications of trouble in the communications system. Results of a test of the communication system are requested (Block 180). Another request is communicated to analyze the test results (Block 182) to help identify the problem with the telephone number. A request may then be communicated to close the trouble ticket (Block 184) when the problem with the telephone number is cleared. The computer program, therefore, tracks and manages the trouble ticket using a customer's telephone number.

The Trouble Ticket Manager (shown as reference numeral 20 in FIGS. 1-13) may be physically embodied on or in a computer-readable medium. This computer-readable medium may include a CD-ROM, DVD, tape, cassette, floppy disk, memory card, and a large-capacity disk (such as IOMEGA® ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer readable media, and other types not mentioned here but considered within the scope of the present invention, allow the Trouble Ticket Manager to be easily disseminated. A computer program product for creating and for managing a trouble ticket would include the computer-readable medium and the Trouble Ticket Manager stored on the medium. The trouble ticket, as before, describes a problem in a communications system. The Trouble Ticket Manager communicates with the communications network (shown as reference numeral 48 in FIGS. 2-13) and receives a request to create the trouble ticket. The Trouble Ticket Manager initiates the trouble ticket and assigns a work item number to the trouble ticket. The work item number comprises a telephone number experiencing the problem in the communications system. The Trouble Ticket Manager distributes the trouble ticket along the communications network to clients. The computer program product identifies and tracks the trouble ticket using a customer's telephone number.

Example

Figure 17:
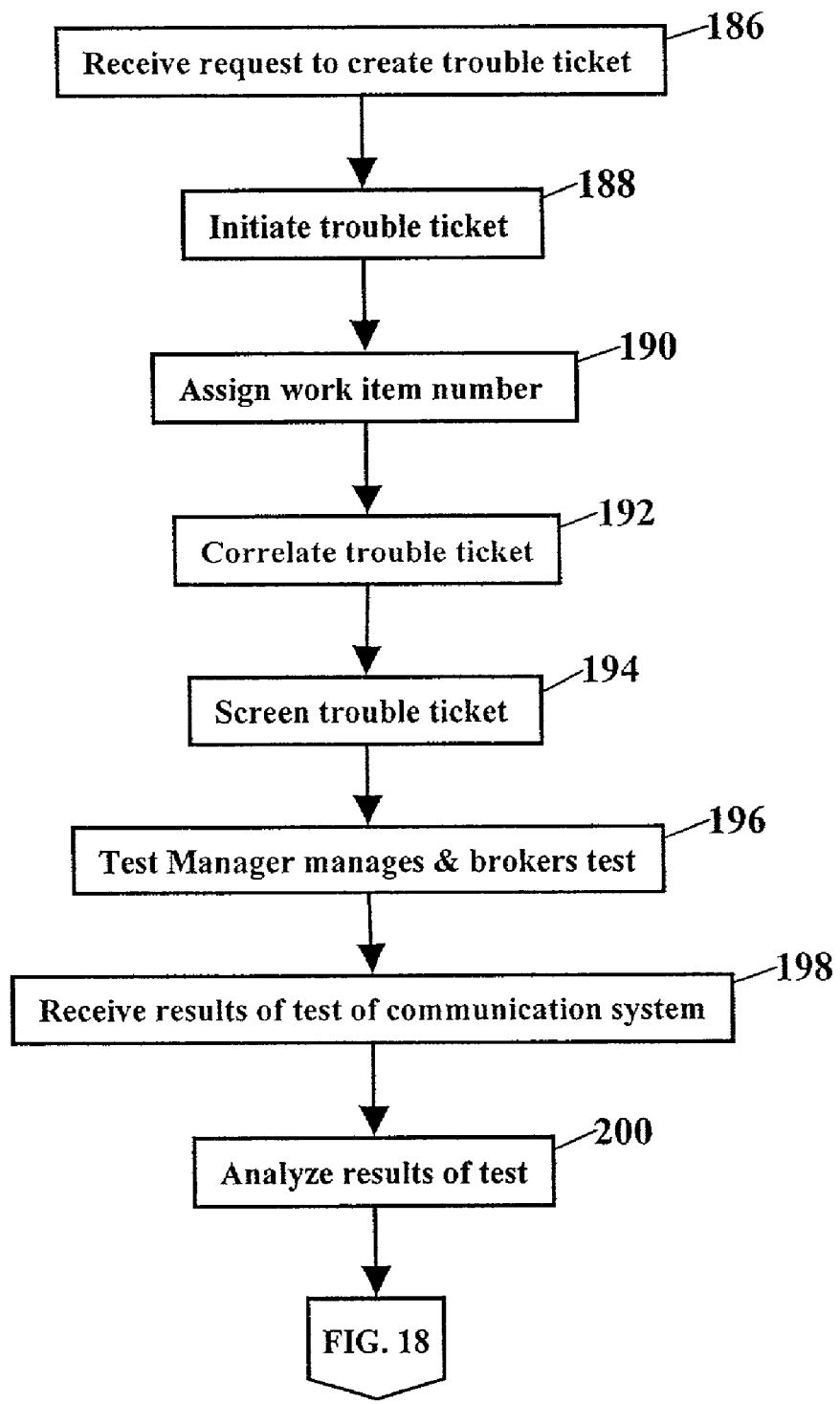
FIGS. 17-20 are flowcharts describing a non-limiting example.

The Trouble Ticket Manager is further illustrated by the following non-limiting example. FIGS. 17-20 are flowcharts describing this non-limiting example. This non-limiting example describes the creation and management of trouble tickets. A trouble ticket, as before, describes a problem in a communications system. FIG. 17 shows a request to create the trouble ticket is received from the communications network (Block 186). The trouble ticket is initiated (Block 188) and a work item number is assigned to the trouble ticket (Block 190). The work item number, as earlier described, comprises a telephone number experiencing the problem with the communications system. The trouble ticket is correlated (Block 192) with an existing trouble ticket having a similar characteristic, and the trouble ticket is screened (Block 194) for known indications of trouble in the communications system. A Test Manager module manages and brokers a test of the communications system to help identify the problem (Block 196). The results of the test are received (Block 198) and then analyzed (Block 200) to help identify the trouble.

Figure 18:
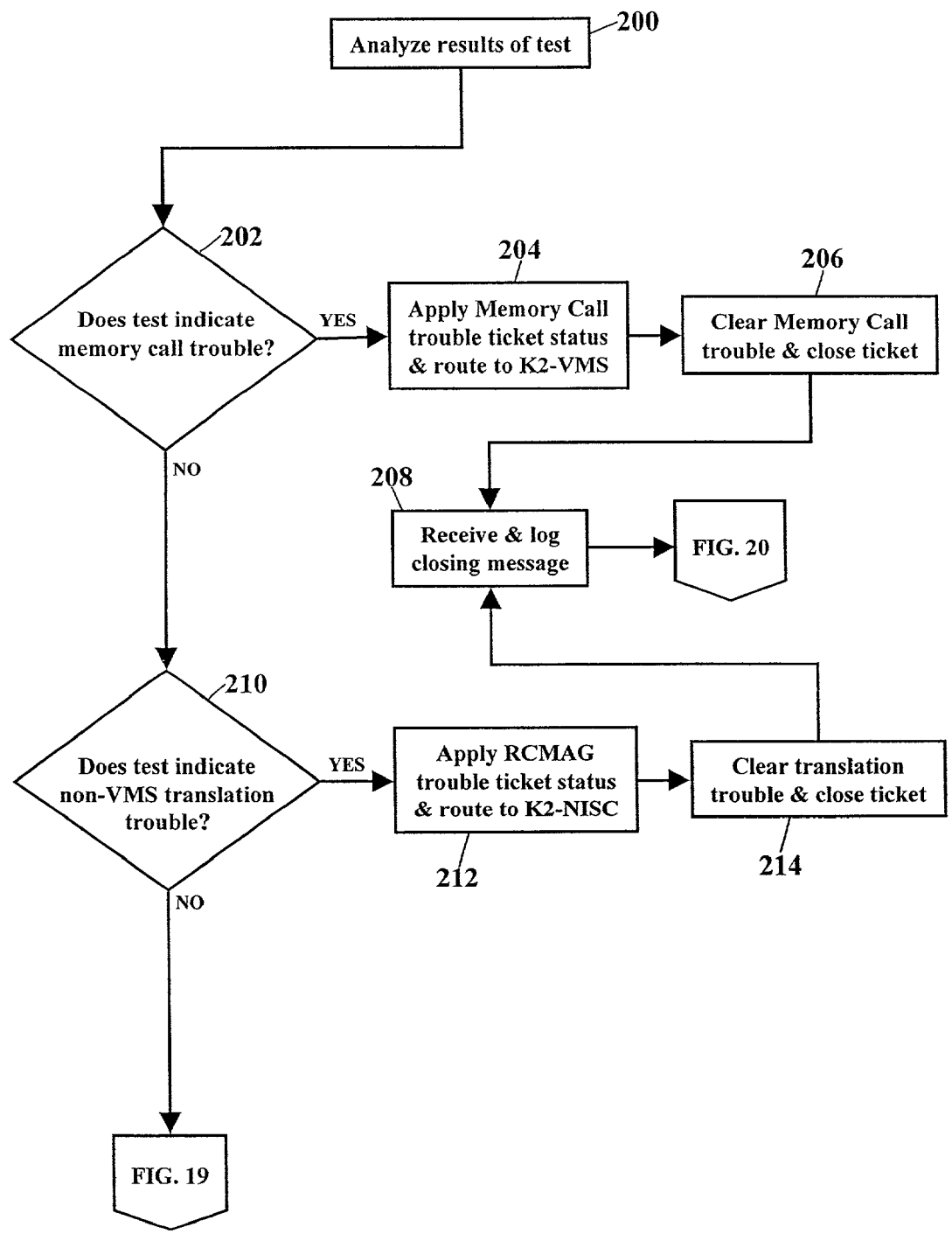

FIG. 18 continues describing the non-limiting example. After the test results are analyzed (Block 200), the trouble ticket is routed according to the test results. If, for example, the test results indicate memory call trouble (Block 202), a memory call status code is applied (Block 204) and the trouble ticket is cleared and closed (Block 206). Any closing message data, from the technician, user, or closing system, is received and logged (Block 208) to complete the trouble ticket history. If the test results, instead, indicate translation trouble (Block 210), an RCMAG status is applied and the trouble ticket is routed to K2-NISC (Block 212). The translation trouble is cleared and the trouble ticket is closed (Block 214). The closing message is received and logged (Block 208).

Figure 19:
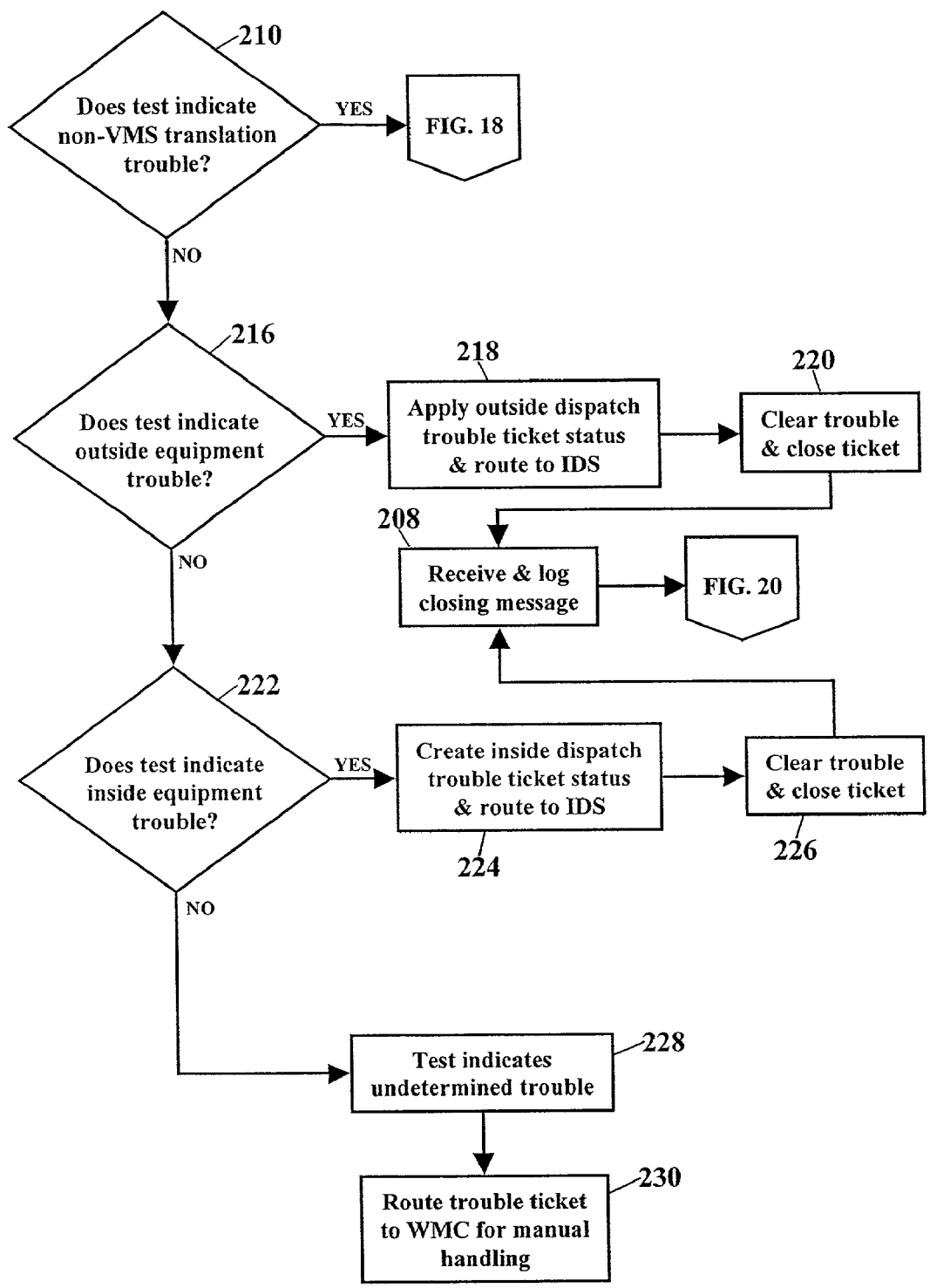

FIG. 19 continues with the description of the non-limiting example. If the test results do not indicate translation trouble (Block 210), then the test results are analyzed for outside plant equipment trouble (Block 216). If a problem with outside plant equipment is found, then an outside dispatch status is applied and the trouble ticket is routed to an Integrated Dispatch System (IDS) (Block 218). The trouble ticket is cleared and closed (Block 220) and the closing message is received and logged (Block 208). If the test results indicate trouble with inside plant equipment (Block 222), an inside dispatch status code is created and the trouble ticket is routed to the Integrated Dispatch System (IDS) (Block 224). The trouble ticket is cleared and closed (Block 226) and the closing message is received and logged (Block 208). If the test results indicate an undetermined problem (Block 228), then the trouble ticket is routed to a Work Management Center (WMC) for manual handling and for human analysis (Block 230).

Figure 20:
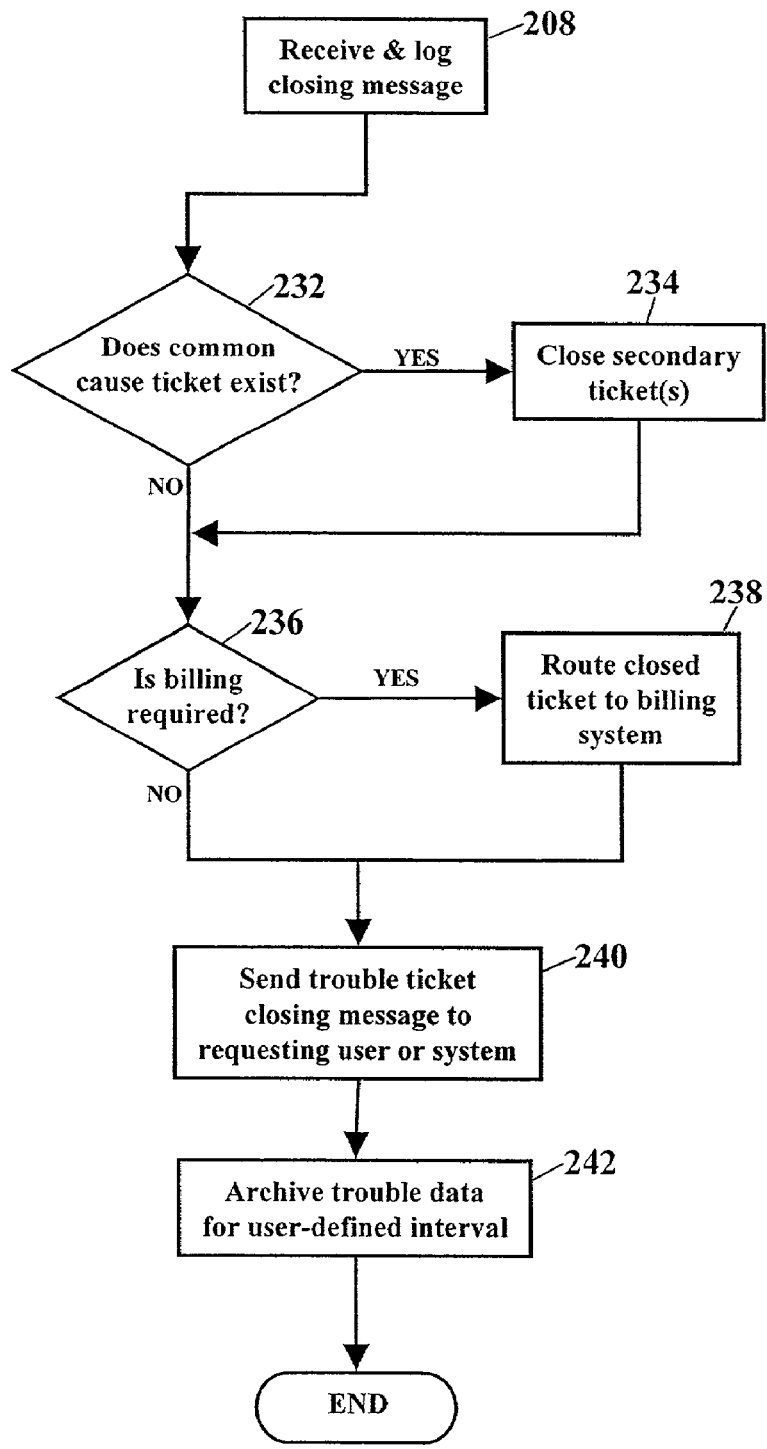

FIG. 20 also continues describing the non-limiting example. Once the closing message is received and logged (Block 208), the non-limiting example checks for common cause trouble tickets. If a common cause trouble ticket is indicated (Block 232), the common cause, secondary trouble tickets are also closed (Block 234). If billing is required (Block 236), the now-closed trouble ticket is routed to the billing system (Block 238). The requesting user or system, originally requesting the trouble ticket, is then send a closing message (Block 240). The closed trouble ticket and the trouble data are archived for subsequent use and for analysis (Block 242). The closing data may be archived for a user-defined interval of time, thus permitting further analysis and use, yet, without requiring an a large expansion of storage capability.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A process of managing a plurality of work orders each associated with a corresponding repair of a problem, the process comprising:

for each of the plurality of work orders, communicating with a communications network, having a computer system with a system memory device and central processor, and receiving a request to create a corresponding work order, the request communicating from a requester;

receiving an appointment for a field visit to repair the problem;

identifying the request and the appointment with a work order number, the work order number comprising a telephone number experiencing the problem;

identifying each of the plurality of work orders with a corresponding work order number, the corresponding work order number comprising a telephone number experiencing the problem;

communicating with the communications network and returning the work order number to the requestor;

identifying the work order using the work order number;

distributing the plurality of work orders to clients by combining two or more work orders of the plurality of work orders to form at least a first group of work orders and a second group of work orders, wherein the first group of work orders share similar characteristics and the second group of work orders share similar characteristics, wherein the work orders are combined by correlating the work orders based on a first predetermined correlation parameter and a second predetermined correlation parameter;

annotating the work orders;

prioritizing the work orders based on the annotations;

annotating the work orders with information from a telephone line record, the information from the telephone line record comprising i) information associated with a customer's service, ii) facility information associated with the customer's service, and iii) information associated with equipment used by the customer;

screening the work orders for a known indication of trouble based on at least one user-defined screening criteria;

receiving a result of a test of the telephone number experiencing the problem;

analyzing the result of the test; and closing the work order when the problem experienced by the telephone number is cleared.

2. A computer program product for managing a plurality of work orders each associated with a corresponding repair of a problem, the computer program product comprising:

a computer-readable storage medium readable by a processing circuit and storing instructions for execution by the processing circuit for facilitating a method comprising:

for each of the plurality of work orders:

communicating with a communications network, having a computer system with a system memory device and central processor, and receiving a request to create a corresponding work order, the request communicating from a requestor;

receiving an appointment for a field visit to repair the problem;

identifying the request and the appointment with a work order number, the work order number comprising a telephone number experiencing the problem;

communicating with the communications network and returning the work order number to the requestor;

identifying the work order using the work order number; and communicating with the communications network and distributing the plurality of work orders along the communications network by combining two or more work orders of the plurality of work orders to form at least a first group of work orders and a second group of work orders, wherein the first group of work orders share similar characteristics, and the second group of work orders share similar characteristics, wherein the work orders are combined by correlating the work orders based on a first predetermined correlation parameter and a second predetermined correlation parameter;

annotating the work orders;

prioritizing the work orders based on the annotations;

annotating the work orders with information from a telephone line record, the information from the telephone line record comprising i) information associated with a customer's service, ii) facility information associated with the customer's service, and iii) information associated with equipment used by the customer;

screening the work orders for a known indication of trouble based on at least one user-defined screening criteria;

receiving a result of a test of the telephone number experiencing the problem;

analyzing the result of the test; and closing the work order when the problem experienced by the telephone number is cleared.

3. A process for creating and for managing a plurality of trouble tickets, each trouble ticket describing a problem in a communications system, the process comprising:

for each of the plurality of trouble tickets, communicating with a communications network, having a computer system with a system memory device and central processor, and receiving a request to create the trouble ticket, the request communicated from a requestor;

initiating the trouble ticket;

assigning a work item number to each of the plurality of trouble tickets, the work item number comprising a telephone number experiencing the problem with the communications system;

communicating with the communications network and distributing each of the plurality of trouble tickets to clients by combining two or more trouble tickets of the plurality of trouble tickets to form at least a first group of trouble tickets and a second group of trouble tickets, wherein the first group of trouble tickets share similar characteristics, and the second group of trouble tickets share similar characteristics, wherein the work orders are combined by correlating the work orders based on a first predetermined correlation parameter and a second predetermined correlation parameter;

annotating the trouble tickets;

prioritizing the trouble tickets based on the annotations;

annotating the trouble tickets with information from a telephone line record, the information from the telephone line record comprising i) information associated with a customer's service, ii) facility information associated with the customer's service, and iii) information associated with equipment used by the customer;

screening the trouble tickets for a known indication of trouble based on at least one user-defined screening criteria;

receiving a result of a test of the telephone number experiencing the problem;

analyzing the result of the test; and closing the trouble ticket when the problem experienced by the telephone number is cleared;

tracking and managing the trouble ticket using a customer's telephone number.

4. A process for creating and for managing a trouble ticket according to claim 3, further comprising annotating the trouble ticket with information from a telephone line record, the information from the telephone line record comprising i) customer information from a Customer Record Information System, ii) facility information from a Loop Facility Assignment Control System, and iii) equipment information from a switching system.

5. A process for creating and for managing a trouble ticket according to claim 3, further comprising prioritizing the trouble ticket according to an origin of the request.

6. A process for creating and for managing a trouble ticket according to claim 3, further comprising prioritizing the trouble ticket according to at least one of a date, a time, and an origin of the request.

7. A process for creating and for managing a trouble ticket according to claim 3, wherein receiving results of the test of the communication system comprises receiving results of a mechanized loop test.

8. A process for creating and for managing a trouble ticket according to claim 3, wherein receiving results of the test of the communication system comprises receiving results of an automated local loop test system.

9. A process for creating and for managing a trouble ticket according to claim 3, wherein receiving results of the test of the communication system comprises receiving results of a digital subscriber line test system.

10. A process for creating and for managing a trouble ticket according to claim 3, wherein receiving results of the test of the communication system comprises receiving results of a fiber optic test system.

11. A process for creating and for managing a trouble ticket according to claim 3, wherein receiving results of the test of the communication system comprises receiving results of an Integrated Services Digital Network test system.

12. A process for creating and for managing a trouble ticket according to claim 3, further comprising assigning a status code to the trouble ticket, the status code assigned according to the results of the test.

13. A process for creating and for managing a trouble ticket according to claim 12, further comprising routing the trouble ticket according to the status code.

14. A process for creating and for managing a trouble ticket according to claim 12, further comprising routing the trouble ticket according to the results of the test.

15. A process for creating and for managing a trouble ticket according to claim 12, further comprising routing the trouble ticket according to the problem with the telephone number.

16. A process for creating and for managing a trouble ticket according to claim 3, further comprising assigning a status code to the trouble ticket, the status code assigned according to the problem with the telephone number.

17. A process for creating and for managing a trouble ticket according to claim 3, further comprising updating the work order with a change in status as the work order progresses from creating to final closure.

18. A process for creating and for managing a trouble ticket according to claim 3, further comprising closing the trouble ticket when the problem with the telephone number is cleared.

19. A process for creating and for managing a trouble ticket according to claim 18, further comprising closing a related trouble ticket, the related trouble ticket having a common cause with the trouble ticket.

20. A process for creating and for managing a trouble ticket according to claim 18, further comprising communicating the trouble ticket to a billing system to update billing records.

21. A process for creating and for managing a trouble ticket according to claim 18, further comprising communicating a message to the requester when the trouble ticket is closed.

22. A process for creating and for managing a trouble ticket according to claim 18, further comprising archiving, for subsequent retrieval, at least one of i) the trouble ticket, ii) the problem, and iii) a status code indicating the problem.

23. A process for creating and for managing a trouble ticket according to claim 18, further comprising archiving, for subsequent retrieval and for a user-defined interval of time, at least one of i) the trouble ticket, ii) the problem, and iii) a status code indicating the problem.

24. A process for creating and for managing a trouble ticket according to claim 3, further comprising communicating the trouble ticket to a billing system to update billing records.

25. A computer program product for creating and for managing a trouble ticket, the trouble ticket describing a problem in a communications system, the computer program product comprising:

a computer-readable storage medium readable by a processing circuit and storing instructions for execution by the processing circuit for facilitating a method comprising:

communicating with a communications network, having a computer system with a system memory device and central processor, and receiving a request to create the trouble ticket, the request communicated from a requestor;

initiating the trouble ticket;

assigning a work item number to the trouble ticket, the work item number comprising a telephone number experiencing the problem;

distributing each of a plurality of created trouble tickets by correlating the trouble ticket with an existing trouble ticket having a similar characteristic by combining two or more trouble tickets of the plurality of created trouble tickets to form at least a first group of trouble tickets and a second group of trouble tickets, wherein the first group of trouble tickets share similar characteristics, and the second group of trouble tickets share similar characteristics, wherein the work orders are combined by correlating the work orders based on a first predetermined correlation parameter and a second predetermined correlation parameter;

annotating the trouble tickets;

prioritizing the trouble tickets based on the annotations;

annotating the trouble tickets with information from a telephone line record, the information from the telephone line record comprising i) information associated with a customer's service, ii) facility information associated with the customer's service, and iii) information associated with equipment used by the customer;

screening the trouble tickets for a known indication of trouble based on at least one user-defined screening criteria;

receiving a result of a test of the telephone number experiencing the problem;

analyzing the result of the test; and closing the trouble ticket when the problem experienced by the telephone number is cleared;

wherein the computer program tracks and manages the trouble ticket using a customer's telephone number.

26. A process for creating and for managing a trouble ticket, the trouble ticket describing a problem in a communications system, the process comprising:

communicating with a communications network, having a computer system with a system memory device and central processor, and receiving a request to create the trouble ticket, the request communicated from a requestor;

communicating with the communications network and requesting that the trouble ticket be initiated;

requesting that a work item number be assigned to the trouble ticket, the work item number comprising a telephone number experiencing the problem;

for each of a plurality of trouble tickets, communicating with the communications network and requesting that the trouble ticket be distributed to clients by combining two or more trouble tickets of the plurality of trouble tickets to form at least a first group of trouble tickets and a second group of trouble tickets, wherein the first group of trouble tickets share similar characteristics, and the second group of trouble tickets share similar characteristics, wherein the work orders are combined by correlating the work orders based on a first predetermined correlation parameter and a second predetermined correlation parameter;

annotating the trouble tickets;

prioritizing the trouble tickets based on the annotations;

annotating the trouble tickets with information from a telephone line record, the information from the telephone line record comprising i) information associated with a customer's service, ii) facility information associated with the customer's service, and iii) information associated with equipment used by the customer;

requesting screening the trouble tickets for a known indication of trouble based on at least one user-defined screening criteria;

requesting results of a test of the telephone number experiencing the problem;

requesting analysis of the result of the test; and requesting closing the trouble ticket when the problem experienced by the telephone wherein the process identifies and tracks the trouble ticket using a customer's telephone number.

27. A process for creating and for managing a trouble ticket according to claim 26, further comprising requesting that the trouble ticket be annotated with information from a telephone line record, the information from the telephone line record comprising at least one of i) customer information from a Customer Record Information System, ii) facility information from a Loop Facility Assignment Control System, and iii) equipment information from a switching system.

28. A process for creating and for managing a trouble ticket according to claim 26, further comprising requesting that the trouble ticket be prioritized according to an origin of the request.

29. A process for creating and for managing a trouble ticket according to claim 26, further comprising requesting that the trouble ticket be prioritized according to at least one of a date, a time, and an origin of the request.

30. A process for creating and for managing a trouble ticket according to claim 26, wherein requesting results of the test of the communication system comprises requesting results of a mechanized loop test.

31. A process for creating and for managing a trouble ticket according to claim 26, wherein requesting results of the test of the communication system comprises requesting results of an automated local loop test system.

32. A process for creating and for managing a trouble ticket according to claim 26, wherein requesting results of the test of the communication system comprises requesting results of a digital subscriber line test system.

33. A process for creating and for managing a trouble ticket according to claim 26, wherein requesting results of the test of the communication system comprises requesting results of a fiber optic test system.

34. A process for creating and for managing a trouble ticket according to claim 26, wherein requesting results of the test of the communication system comprises requesting results of an Integrated Services Digital Network test system.

35. A process for creating and for managing a trouble ticket according to claim 26, further comprising requesting a status code be assigned to the trouble ticket, the status code assigned according to the results of the test.

36. A process for creating and for managing a trouble ticket according to claim 35, further comprising requesting that the trouble ticket be routed according to the status code.

37. A process for creating and for managing a trouble ticket according to claim 35, further comprising requesting that the trouble ticket be routed according to the results of the test.

38. A process for creating and for managing a trouble ticket according to claim 35, further comprising requesting that the trouble ticket be routed according to the problem with the telephone number.

39. A process for creating and for managing a trouble ticket according to claim 26, further comprising requesting that a status code be assigned to the trouble ticket, the status code assigned according to the problem with the telephone number.

40. A process for creating and for managing a trouble ticket according to claim 26, further comprising requesting that the work order be updated with a change in status as the work order progresses from creating to final closure.

41. A process for creating and for managing a trouble ticket according to claim 26, further comprising requesting that a related trouble ticket be closed, the related trouble ticket having a common cause with the trouble ticket.

42. A process for creating and for managing a trouble ticket according to claim 26, further comprising requesting that the trouble ticket be communicated to a billing system to update billing records.

43. A process for creating and for managing a trouble ticket according to claim 26, further comprising requesting that a message be communicated to the requester when the trouble ticket is closed.

44. A process for creating and for managing a trouble ticket according to claim 26, further comprising requesting that at least one of i) the trouble ticket, ii) the problem, and iii) a status code indicating the problem be archived for subsequent retrieval.

45. A process for creating and for managing a trouble ticket according to claim 26, further comprising requesting that at least one of i) the trouble ticket, ii) the problem, and iii) a status code indicating the problem be archived for subsequent retrieval and for a user-defined interval of time.

46. A process for creating and for managing a trouble ticket according to claim 26, further comprising requesting that the trouble ticket be communicated to a billing system to update billing records.

47. A computer program product for creating and for managing a trouble ticket, the trouble ticket describing a problem in a communications system, the computer program product comprising:

a computer-readable storage medium readable by a processing circuit and storing instructions for execution by the processing circuit for facilitating a method comprising:

communicating with a communications network, having a computer system with a system memory device and central processor, and receiving a request to create a trouble ticket;

communicating with the communications network and requesting that the trouble ticket be initiated;

requesting that a work item number be assigned to the trouble ticket, the work item number comprising a telephone number experiencing the problem;

for each of a plurality of trouble tickets, communicating with the communications network and requesting that the trouble ticket be distributed to clients by combining two or more trouble tickets of the plurality of trouble tickets to form at least a first group of trouble tickets and a second group of trouble tickets, wherein the first group of trouble tickets share similar characteristics, and the second group of trouble tickets share similar characteristics, wherein the work orders are combined by correlating the work orders based on a first predetermined correlation parameter and a second predetermined correlation parameter;

annotating the trouble tickets;

prioritizing the trouble tickets based on the annotations;

annotating the trouble tickets with information from a telephone line record, the information from the telephone line record comprising i) information associated with a customer's service, ii) facility information associated with the customer's service, and iii) information associated with equipment used by the customer;

requesting screening the trouble tickets for a known indication of trouble based on at least one user-defined screening criteria;

requesting results of a test of the telephone number experiencing the problem;

requesting analysis of the result of the test; and requesting closing the trouble ticket when the problem experienced by the telephone number is cleared;

wherein the computer program identifies and tracks the trouble ticket using a customer's telephone number.

* * * * *